United States Patent
Haugeberg et al.

(10) Patent No.: US 10,829,231 B2
(45) Date of Patent: Nov. 10, 2020

(54) INTEGRAL LIFE RAFT, SURVIVAL KIT, AND STEP

(71) Applicant: Textron Innovations Inc., Providence, RI (US)

(72) Inventors: Chad Richard Haugeberg, Arlington, TX (US); Timothy Carr, Grapevine, TX (US); Michael Stephen Deslatte, Saginaw, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 362 days.

(21) Appl. No.: 15/890,249

(22) Filed: Feb. 6, 2018

(65) Prior Publication Data

US 2019/0241271 A1 Aug. 8, 2019

(51) Int. Cl.
*B64D 25/16* (2006.01)
*B64F 1/30* (2006.01)
*B63C 9/23* (2006.01)
*B64C 27/04* (2006.01)

(52) U.S. Cl.
CPC ............... *B64D 25/16* (2013.01); *B64F 1/30* (2013.01); *B63C 9/23* (2013.01); *B64C 27/04* (2013.01)

(58) Field of Classification Search
CPC .. B64D 25/16; B64F 1/30; B63C 9/23; B63C 9/22; B64C 27/04
See application file for complete search history.

(56) References Cited

U.S. PATENT DOCUMENTS

| 7,309,267 B1 | 12/2007 | Henry et al. |
| 9,238,508 B2 | 1/2016 | Lafon et al. |
| 2014/0284420 A1 | 9/2014 | Hainsworth |
| 2015/0166155 A1* | 6/2015 | Tseng ........................ B63C 9/23 441/93 |

FOREIGN PATENT DOCUMENTS

| EP | 2610171 A1 | 7/2013 |
| EP | 3263451 A1 | 1/2018 |
| WO | 2005019026 A2 | 3/2005 |
| WO | 2005019026 A3 | 3/2005 |

OTHER PUBLICATIONS

Airbus Helicopters; "Standard Upgrades," France, Nov. 2015, 244 pages (Relevant p. 148).

* cited by examiner

*Primary Examiner* — Rodney A Bonnette
(74) *Attorney, Agent, or Firm* — Slater Matsil, LLP

(57) ABSTRACT

An embodiment rotorcraft structure includes a step disposed at an exterior of the rotorcraft, and an emergency kit installed into the recess of the step. The step is faired into a skin on the exterior of the rotorcraft. The emergency kit includes a container and a life raft. The container includes a container body that has a storage cavity, a container panel, and a first attachment element. The container body is disposed in the recess of the step, attached to the step, and has a storage cavity. The container panel is disposed at a bottom of the storage cavity, and the life raft is disposed in the storage cavity. The first attachment element releasably couples a first edge of the container panel to the container body, and encloses the life raft in the container under the step.

23 Claims, 18 Drawing Sheets

INTEGRAL LIFE RAFT, SURVIVAL KIT, AND STEP

TECHNICAL FIELD

The present invention relates generally to a system and method for an integral life raft, survival kit and step for a rotorcraft. In particular embodiments, the present invention relates to a system and method for fitting a life raft and survival kit into the step of a rotorcraft, making the life raft and survival kit integral with the rotorcraft, and a system and method for activating and using the life raft with the survival kit in the event of an emergency water landing.

BACKGROUND

The 1940s ushered in full scale production of rotorcrafts and more widespread use of rotorcrafts in both private and government sectors. Since then, rotorcraft design continues to evolve with increased complexity at a rapid rate. At the same time, given the high cost of new rotorcrafts, operators are interested in being able to purchase kits to retrofit existing fleets with the latest technology or design features.

In particular, there is an increased market demand to improve the safety and survival kit offerings for rotorcrafts. Increased use of rotorcrafts to support deep-water operations rotorcraft operators and insurance providers has increased requests for more safety related technology and gear. For example, the petroleum industry continues to insist on more emergency training for pilots, or other operators and off-shore personnel, as well as more support gear on rotorcraft in case passengers and crew have to evacuate a rotorcraft offshore.

At the same time, rotorcraft manufacturers need to balance the market demands with cost and efficiency. As a result, safety related technology and support gear continue to become more affordable and accessible. Also, increased fueling and operation costs, make it more desirable to offer safety related technology and support gear that sacrifice less of the existing form, function and efficiency of the rotorcraft, whether in a retrofit kit or new installation.

SUMMARY

An embodiment rotorcraft structure includes a step, and an emergency kit. The step is disposed at an exterior of the rotorcraft. The step has a recess. The step is faired into a skin on the exterior of the rotorcraft. The emergency kit is installed into the recess of the step. The emergency kit includes a container, and a life raft. The container includes a container body, a container panel, and a first attachment element. The container body is disposed in the recess of the step. The container body is attached to the step. The container body has a storage cavity. The container panel is disposed at a bottom of the storage cavity. The life raft is disposed on the container panel, and within the storage cavity. The first attachment element releasably couples a first edge of the container panel to the container body, and retains the life raft in the container.

An embodiment assembly structure includes a container, a life raft in the container, and an inflation mechanism coupled to the life raft. The container includes a container body and a container bottom. The life raft is in the container. The inflation mechanism is coupled to the life raft. The container includes a container body, and a container bottom. The container body includes a container top and a plurality of container sides. The container body has a storage cavity. The container bottom is disposed at a bottom of the storage cavity. The container bottom is releasably coupled to the container body. The life raft has a first portion and a second portion opposite the first portion, and a third portion between the first portion and the second portion. A top surface of the third portion is below a top surface of the first portion, and the top surface of the third portion is below a top surface of the second portion.

In an embodiment method, an emergency kit is provided that includes a container and a life raft in the container. The emergency kit is inserted into a recess of a step on a rotorcraft. The emergency kit is secured to the step. The step is disposed at an egress region of the rotorcraft on an exterior surface of the rotorcraft that is above and separate from a landing gear of the rotorcraft. Once the emergency kit is inserted, the life raft is disposed within a storage cavity having a periphery that includes a bottom interior surface of the container.

In an embodiment method, a mechanism is released. The mechanism is coupled to a charged bottle, and the mechanism and the charged bottle are disposed in an interior of a rotorcraft. A release of the mechanism activates an emergency kit installed into a step that is disposed at an exterior of the rotorcraft, and that is separate and apart from landing gear of the rotorcraft. Gas is discharged, in response to releasing the mechanism, from the charged bottle into a gas channel that extends from the charged bottle into a life raft in the emergency kit that is disposed in a recess of the step. The emergency kit includes a life raft and a container. The life raft is disposed in a storage cavity in the container. The life raft is inflated, in response to the discharge of gas. The storage cavity is opened to an exterior of the step, in response to the life raft being inflated. The inflating life raft pushes a side of a container panel away from a step surface. The life raft is released from the step. The mechanism is released by sending a release signal to the charged bottle with an electric coupling of the mechanism to the charged bottle, or engaging a release of gas from the charged bottle, with a member that physically couples the mechanism to the charged bottle.

BRIEF DESCRIPTION OF THE DRAWINGS

Aspects of the present disclosure may be understood from the following detailed description when read in conjunction with the accompanying Figures. It is noted that, in accordance with standard practice in industry, various features may not be drawn to scale. For example, dimensions of various features may be arbitrarily increased or reduced for clarity of illustration or description. Corresponding numerals and symbols in different Figures generally refer to corresponding parts, unless otherwise indicated.

DETAILED DESCRIPTION OF ILLUSTRATIVE EMBODIMENTS

Figure 1:
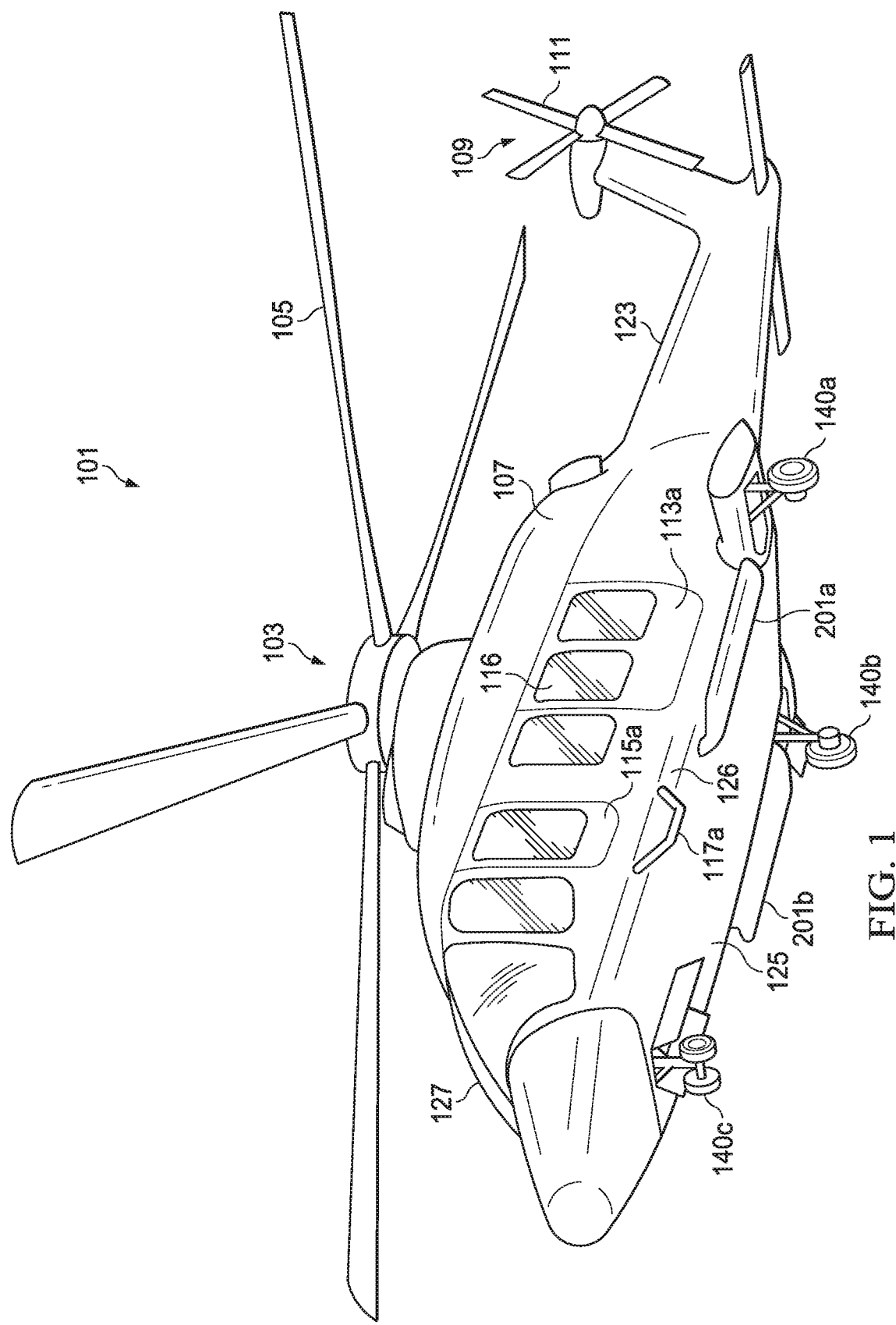
FIG. 1 illustrates a rotorcraft, according to some embodiments.

The following disclosure provides different embodiments, or examples, for implementing different features of the subject matter disclosed herein. Specific examples of components and arrangements are described below to simplify the present disclosure. These are, of course, merely examples and are not intended to be limiting. In addition, the present disclosure may repeat reference numerals or letters in various examples. This repetition is for simplicity and clarity of discussion, and does not in itself dictate a relationship between various embodiments or configurations. Therefore, various changes, substitutions, or alterations can be made herein without departing from the spirit and scope of the appended claims.

Life rafts are increasingly offered in rotorcrafts in the event that the occupants of a rotorcraft (including the pilot, or other operators and personnel, and passengers), have to evacuate the rotorcraft in the event of an emergency water landing, after pilots determine it is necessary to ditch the rotorcraft. A larger capacity rotorcraft may need two life rafts and other survival gear (and the life raft, survival kit and other related gear may also be collectively and individually referred to as ditching equipment or ditching gear). One example of life rafts that meet Technical Standard Order issued by the FAA would be 1218FASA life rafts.

A life raft, survival kit, and step assembly is described herein, with the life raft and survival kit being referred to as an emergency kit. Embodiments of the system and method provide for fitting a life raft and survival kit into the step of a rotorcraft, so that the emergency kit is integral with the rest of the rotorcraft, as well as a system and method for activating (or otherwise deploying) the emergency kit and boarding the life raft in the event of an emergency water landing. Although described in connection with a rotorcraft, it should be understood that embodiments described herein are applicable to other aircraft implementations, including hybrid aircraft, tilt rotor aircraft, tandem rotorcraft, or the like, as well as fixed wing aircraft, boats, or other types of vehicles.

The emergency kit may, in some embodiments, be installed into the step of a rotorcraft, within the recess formed by the existing step structure of the step of the rotorcraft. The disposition of the emergency kit, which is inside the step and integral with the step, maximizes available space in the cabin or interior of the rotorcraft for passengers or cargo, as opposed to storing a life raft in the interior or within the interior wall of the rotorcraft, as may be the case when a life raft is arranged inside the wall around a door of the rotorcraft. At the same time, storing the emergency kit inside the step also utilizes a space that is not already occupied or used for other basic aircraft systems.

Further, the disposition of the emergency kits in the steps permits the rotorcraft to be operated in a manner familiar to pilots, without adding any other additional support or other modifications to the rotorcraft structure. The routine operation, use and handling of the rotorcraft is substantially unaltered by installation of the emergency kits into the steps of the rotorcraft. The structure of each step supports the weight of the life raft inside without substantial add-ons to the structure. The step continues to be able to bear the step load associated with disembarking or embarking the rotorcraft through its passenger doors (that may be referred to as egress in the egress region of the rotorcraft), after installation of the emergency kit, after deployment of the life raft, and after removal of the emergency kit from the step. The existing outer mold lines (OML), and aerodynamic profile of the step and the rotorcraft are substantially unaltered by the installation of the emergency kit into the step. Further, housing the life raft and survival kit in the interior of the step, as opposed to other locations on the rotorcraft, permits the center of gravity to continue remaining below the center of lift of the rotorcraft, because weight is balanced on both sides (with one emergency kit in each step), and because the added weight is not above the center of lift of the rotorcraft.

The emergency kit also has a degree of portability that enables a maximum reuse of parts. The emergency kit can be removed from one rotorcraft that is being retired, and installed into another rotorcraft of the same model, or having a similarly dimensioned step as the retired rotorcraft.

The emergency kit is safe and easy to use when occupants evacuate the rotorcraft after an emergency water landing. Occupants in the rotorcraft have easy access, whether in the interior or exterior of the rotor craft, to remove a breakaway panel and pull the handle under the breakaway panel to initiate deployment of the life raft and survival kit from the step. An aesthetic cover panel covers the handle on the interior. A breakaway panel covers the handle on the exterior of the rotorcraft. Occupants (including the passengers and personnel) do not have to remove or move any chairs, large door panels, or other heavy equipment or fixtures in order to commence deployment. Once activated, the life raft deploys at the egress region or location of the rotorcraft. Evacuees can exit from the passenger door and use the step to board the life raft. The step continues to bear the step load even if the upper panel of the step is submerged below the surface of the water, e.g., around a foot below the surface, as may be the case after activation of the rotorcraft's flotation system.

The emergency kit is easily maintained because it is accessible externally to the cabin. The life raft can be readily removed and examined and replaced without having to undo the interior or external step structure of the rotorcraft, by removing the life raft after unhinging or opening the bottom panel of the emergency kit. The survival kit can be positioned on top of the life raft inside the step, so that the survival kit is below or accessible through an upper access panel in the step's upper panel. Periodic examination is required to ensure no survival kit components have expired.

Other parts interacting with, and associated with, activation of the emergency kit may be positioned or separated out to be more readily accessed for individual inspection and servicing, without having to remove the entire system from the rotorcraft. For example, the charged bottle is filled with a pressurized volume of nitrogen, oxygen, air, or other gases. The gas fills the life raft during deployment. The charged bottle can be secured or otherwise positioned inside the airframe of the rotorcraft outside or away from the emergency kit and the step. A gas via or conductor or duct, such as a tube, extends from the charged bottle into the interior of the step, to be connected to a fill port on the life raft. The charged bottle can be accessed through an access panel on the exterior skin of the rotorcraft or through the interior in the cabin of the rotorcraft. The cable connecting the pull handle or other activation device to initiate the discharge of gas from the charged bottle into the life raft can also be positioned away from the emergency kit or step, in a location more easily accessed for inspection and servicing. The positioning of the pull handles on the interior or exterior of the rotorcraft remote or away from the emergency kit and the step allows easy access to activate the emergency kit (as opposed to being on or inside the step) and also provide easy access of the pull handles for inspection and servicing.

FIG. 1 illustrates the overall structure of rotorcraft 101, according to some embodiments. Rotorcraft 101 has main rotor assembly 103 with a plurality of main rotor blades 105. Forward usually indicates the side closest to front or nose of rotorcraft 101. Aft usually indicates the side closest to tail section 123 in rear of rotorcraft 101. Elements referenced as being on a front side or back side may refer to those sides that are substantially orthogonal to a forward side and an aft side. It should be understood that directional references are provided below in relation to each other, and their order and orientation may be reversed in some embodiments.

Rotorcraft 101 is equipped with selective pitch control main rotor blades 105 to control direction, thrust, and lift of rotorcraft 101. Rotorcraft 101 has tail section 123 and fuselage 125. Fuselage 125 may be referred to as the main body of rotorcraft 101 in some embodiments. Fuselage 125 includes outer hull or skin 126 covering the structural frame that defines the shape and dimensions of the main body of rotorcraft 101. The entirety of the structural frame is not shown (but a part of structural frame, 104a is illustrated later in one of the cutaway views in FIG. 4).

Tail section 123 includes anti-torque system 109 with tail rotor blades 111 configured to counter the torque generated by main rotor assembly 103. Power is supplied to main rotor assembly 103 and anti-torque system 109 by engines (not shown). There may be one or more engines disposed in an upper fuselage portion 107, and one or more fuel tanks (not shown) disposed, for example, in the belly of the rotorcraft below the cabin or passenger compartment 116 behind passenger door 113. The output of the engine is provided to a driveshaft (not shown) mechanically and operatively coupled to main rotor assembly 103 and anti-torque system 109 through a main rotor transmission (not shown) and a tail rotor transmission (not shown), respectively.

Fuselage 125 includes cockpit 127 and a cargo or passenger compartment 116 behind passenger door 113a. It should be understood that fuselage 125 includes a similar passenger door (not shown) on the other opposite side of rotorcraft 101 in some embodiments. Cockpit 127 includes displays, controls, and instruments (not shown). It should be appreciated that even though rotorcraft 101 is depicted as having certain illustrated features, rotorcraft 101 may have a variety of implementation-specific configurations in some embodiments, e.g., different configurations or functionality in cockpit 127.

Rotorcraft 101 includes landing gear with wheels 140a, 140b, 140c providing ground support. Wheels 140a, 140b, 140c include parts that are secured, mounted or otherwise attached to the structural frame (not shown) under skin 126 of fuselage 125 on exterior of rotorcraft 101. Wheels 140a, 140b, 140c, may be secured, mounted or otherwise attached to structural frame under skin 126, can be attached to the structural frame with bolts, screws, rivets, adhesives or other materials or methods of attachment. In some embodiments, one or more of wheels 140a, 140b, and 140c may be retractable for flight. In other embodiments, landing gear may include skids, in addition to or in place of wheels 140a, 140b, 140c. Similar to landing gear, all other parts or components described below may be attached with similar materials and methods as those described above, or with different means of attachment.

Rotorcraft 101 further includes one or more steps, 201a, 201b on the exterior of the rotorcraft to be used for occupants for ingress into and egress from rotorcraft 101 (that may be collectively and individually referred to as egress) above, and separate from, the landing gear (whether the landing gear are wheels 140a, 140b, and 140c or skids). Steps 201a, 201b are disposed below the passenger doors 113a (and other passenger door on opposite side) at the egress regions of rotorcraft 101. Steps 201a, 201b may also be referred to as passenger steps, although steps 201a, 201b can also include a step for the operators of rotorcraft 101 below their ingress into and egress from rotorcraft. Steps 201a, 201b may also be a ledge used to load cargo through a door into the interior of rotorcraft 101.

Steps 201a, 201b are disposed on the exterior of rotorcraft 101 on skin 126 of fuselage 125, and have support structure that is attached to the underlying structural frame of rotorcraft 101 (not shown). Occupants may step onto step 201a when entering rotorcraft 101 through passenger door 113a to reach cabin or passenger compartment 116 inside rotorcraft 101. A pilot or other operator of rotorcraft 101 may use support 117a to enter cockpit 127 through pilot door 115a. In certain embodiments, passengers seated in the front row may enter through pilot door 115a. Steps 201a, 201b are faired into skin 126 on fuselage 125 of rotorcraft 101, by faired surfaces that smooth transition between the steps 201a, 201b and the fuselage skin. Faired surfaces, apart from the aesthetic, also reduce drag, by providing a smooth OML for steps 201a, 201b and rotorcraft 101.

Figure 2:
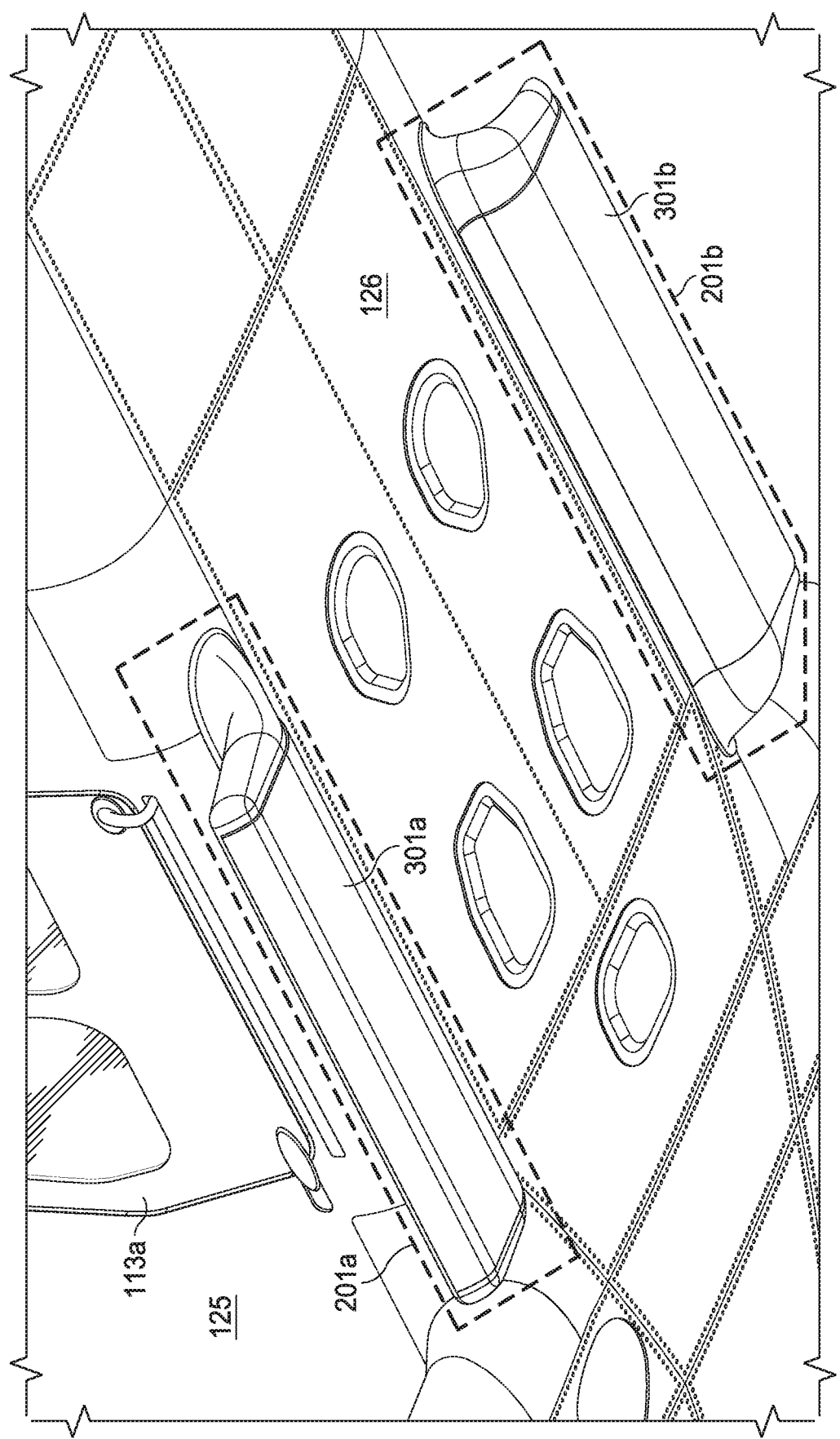
FIG. 2 illustrates a bottom view of a rotorcraft, according to some embodiments.

FIG. 2 illustrates a bottom view of a rotorcraft, according to some embodiments. A bottom view of fuselage 125 provides bottom view of steps 201a, 201b. Emergency kit 301a is installed into step 201a. Emergency kit 301b is installed into step 201b.

In other embodiments, steps 201a, 201b may have a different shape, or may be integrated with or attached to the skid landing gear for rotorcraft 101. Some buyers may specify instead, for example, a tube step design that may include a metallic tube mounted to an exterior of rotorcraft 101. Any shaped structure for step 201a, 201b may be used in other embodiments instead of a faired step design, provided the shape defines an interior cavity large enough to accommodate and store a deflated life raft and other emergency gear, and that opens to allow for deployment of a life raft from its interior. In other embodiments, for example, support 117a from FIG. 1, can be used to store and deploy a life raft, as described below, depending on the dimensions of the step and the dimensions of the life raft.

Figure 3:
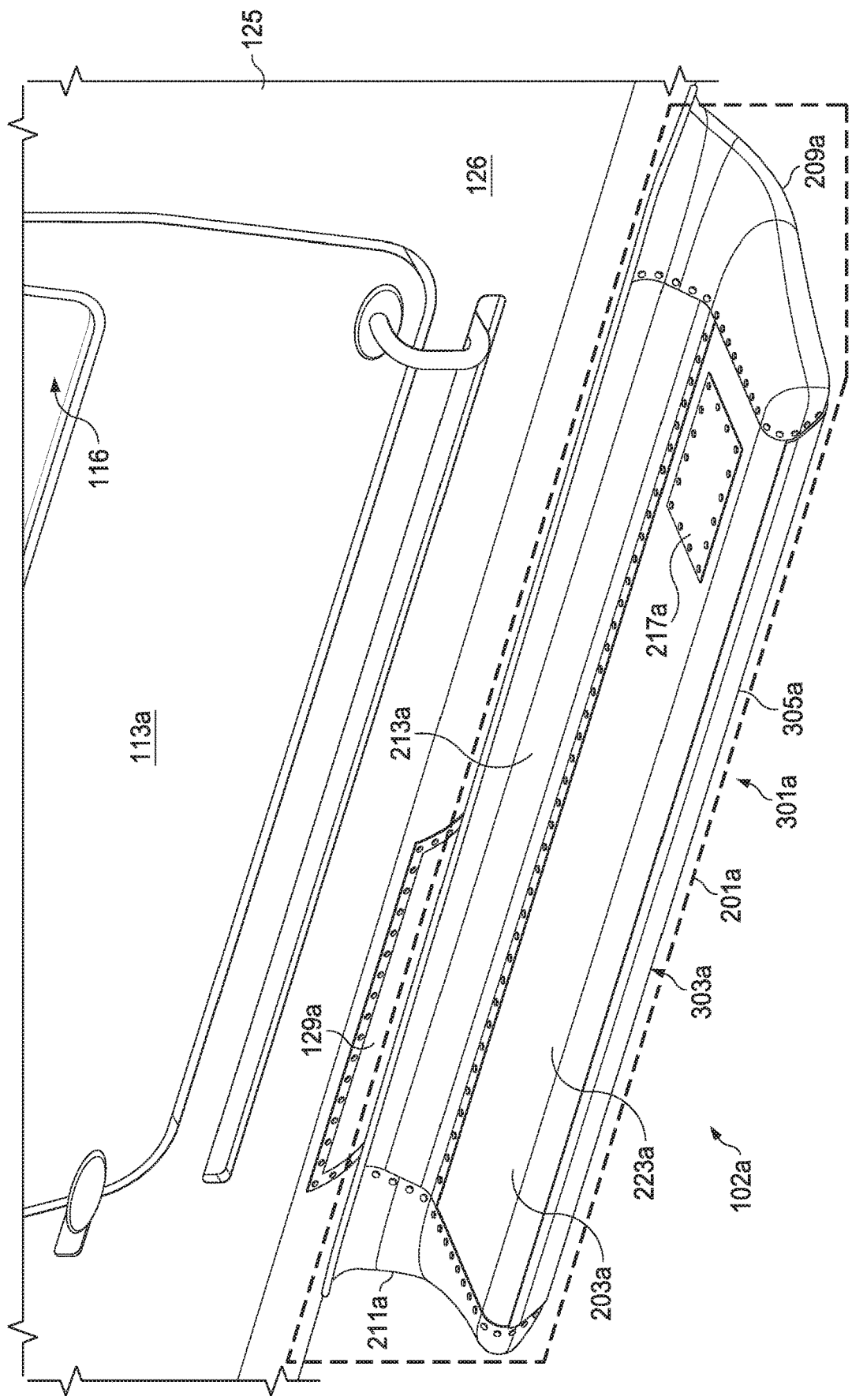
FIG. 3 illustrates a side of a rotorcraft, with step and emergency kit, according to some embodiments.

FIG. 3 provides an illustration of a side of step 201a with emergency kit 301a installed into step 201a, according to some embodiments. It should be understood that the other step (i.e., step 2001b and emergency kit 301b identified in FIGS. 1-2) is similarly configured installed and used, as for step 201a and emergency kit 301a, according to some embodiments. Container bottom 305a of container 303a is the part of emergency kit 301a visible from the exterior, once emergency kit 301a is installed into step 201a. Step 201a is disposed below passenger door 113a at egress region 1002a. Step 201a includes upper panel 203a (sometimes referred to as step upper panel). Upper panel 203a is opposite container bottom 305a. Occupants step on the substantially flat horizontal upper surface 223a on upper panel 203a to board or leave rotorcraft 101 at egress region 102a. Upper back fairing 213a provides a faired surface between upper panel 203a and skin 126. Forward fairing 209a provides a faired surface at the forward side of step 201a. Aft fairing 211a provides a faired surface at the aft side of step 201a.

There are two access panels, upper access panel 217a and bottle access panel 129a, that can be selectively removed to access regions behind them. Bottle access panel 129a disposed above aft side of step 201a, can be selectively removed for access through skin 126 to the components underneath. The components underneath comprise the inflation system connected to emergency kit 301a, including the charged bottle 503a (See FIG. 4), and other components illustrated in FIGS. 4-5, and described further below. In some embodiments, upper access panel 217a is disposed at the forward side of step 201a, and can be selectively removed for access through upper panel 203a to survival kit 701a, that is also illustrated in FIGS. 4-5, and described in further detail below.

Figure 4:
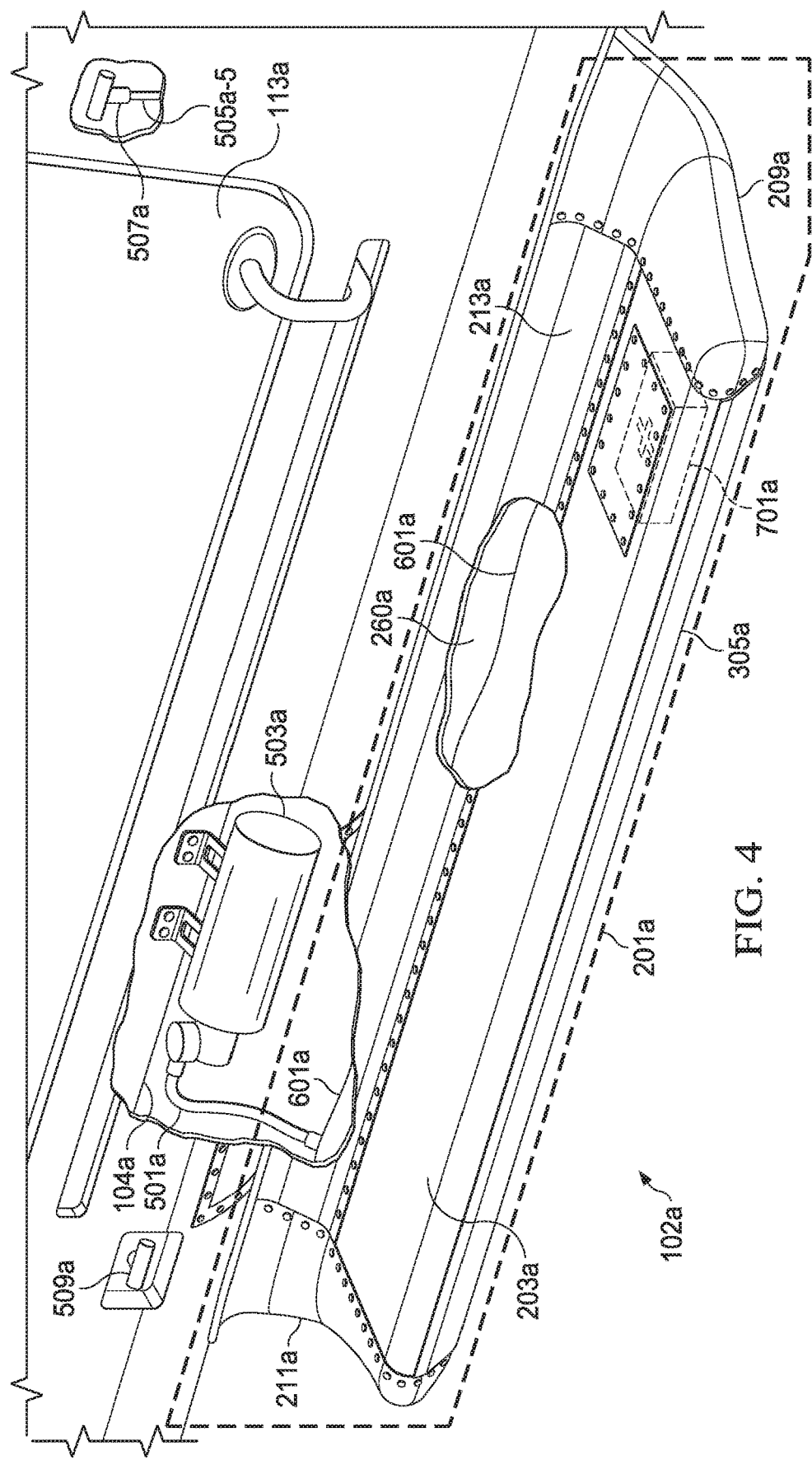
FIG. 4 illustrates a side view of a rotorcraft, with cut-aways in the step and fuselage, according to some embodiments.
Figure 5:
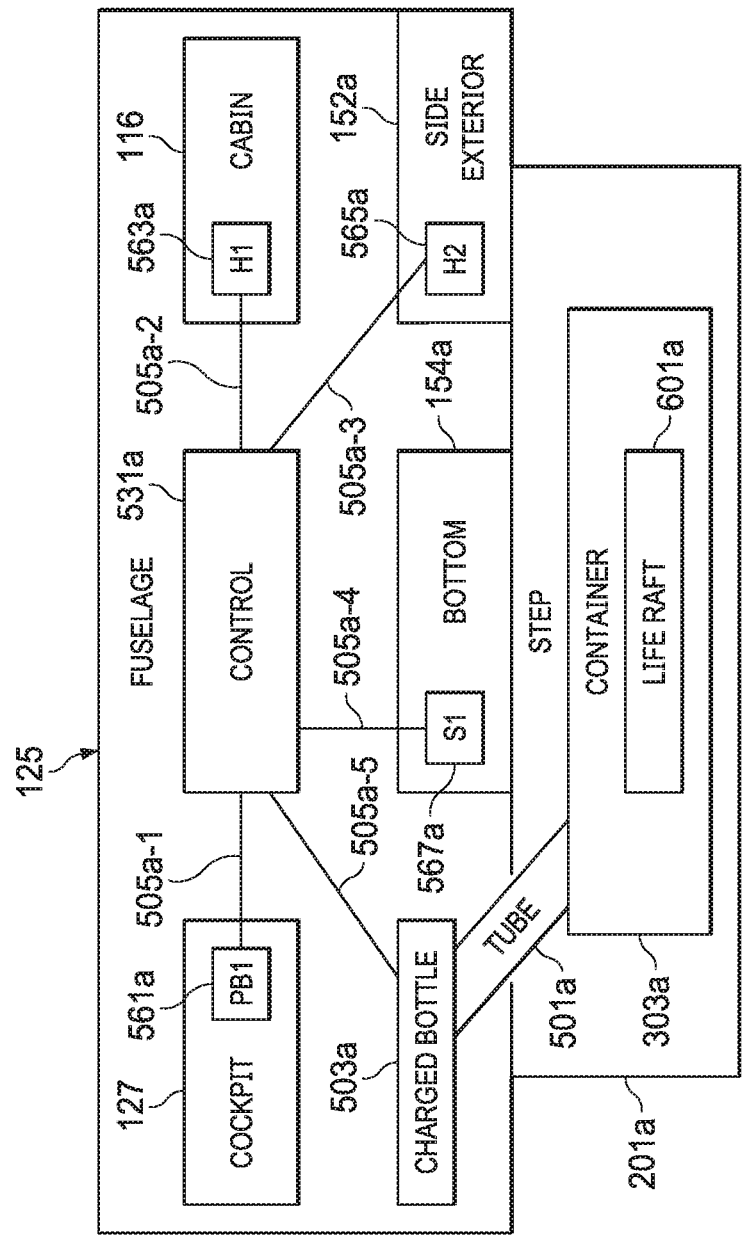
FIG. 5 illustrates a block diagram of a fuselage, with step and emergency kit, according to some embodiments.

FIG. 4 provides cutaway views of the step 201a and fuselage 125, showing certain interiors of step 201a and emergency kit 301a at egress region 102a of rotorcraft 101, according to some embodiments. As shown under one cutaway, life raft 601a is arranged on container bottom 305a, to be stored in a deflated state, inside storage cavity 260a. Life raft 601a has a rated capacity to carry at least half of the maximum occupancy of rotorcraft 101 on water, after being inflated and deployed from step 201a.

Another cutaway in FIG. 4 of fuselage 125 shows those components or elements disposed behind bottle access panel 129a in FIG. 3. Removal of bottle access panel 129a disposed above aft side of step 200a, provides access through skin 126 to charged bottle 503a, tube 501a into life raft 601a, and cables 505a that connect charged bottle 503a to interior activation handle 507a and exterior activation handle 509a. Interior activation handle 507a can be accessed from an interior of passenger compartment 116, and can be disposed above a floor where it is reachable. Exterior activation handle 509a can be disposed above a side of step 201a, to be reachable from exterior of step 201a. Exterior activation handle 509a may be pulled out and away from rotorcraft 101. In other embodiments, interior activation handle 5007a can be disposed in another interior (e.g., cockpit 127 shown in FIG. 1). According to some embodiments, both interior activation handle 507a and exterior activation handle 509a may be covered with breakaway panels (not shown) to avoid accidental activation of emergency kit 301a.

Removal of upper access panel 217a (shown in FIG. 3), provides access, as shown in FIG. 4, through upper panel 203a to survival kit 701a. Survival kit 701a is disposed on top of life raft 601a inside step 201a. Survival kit 701a may be a type specified in the Joint Aviation Requirement for the operation of commercial air transport, third edition (JAR-OPS 3) with certain types of food, water, and other emergency supplies. Survival kit 701a may be equipped with an emergency locator transmitter (ELT) (not shown). Alternatively, life raft 601a may be separately equipped with its own ELT outside of survival kit 701a. Survival kit 701a is illustrated as a rigid container, or box. In other embodiments, survival kit 701a may be housed in a flexible or soft container, such as a bag or sac that can be more easily manipulated when packed with life raft 601a inside container 303a.

FIG. 5 provides a block diagram of fuselage 125, with step 201a and emergency kit 301a, according to some embodiments. In some embodiments, there are four activation mechanisms, Push Button 1 (PB1) 561a, Handle 1 (H1) 563A, Handle 2 (H2) 565a, and sensor 1 (S1) 567a, that are each adapted to activate the emergency kit 301a. They are disposed in various locations inside and outside fuselage 125 and outside and spaced apart from step 201a. Push Button 1 (PB1) 561a is a push button switch disposed in cockpit 127 in the interior of fuselage 125, accessible by personnel operating rotorcraft 101, that can electrically trigger activation of the charged bottle 503a. Handle 1 (H1) 563a is a pull handle that is disposed in cabin or passenger compartment 116 in the interior of fuselage 125, accessible by personnel or other occupants of rotorcraft 101. Handle 1 (H1) 563a comprises internal activation handle 507a shown in FIG. 4. Handle 2 (H2) 565a is a pull handle that is disposed on side exterior 152a of fuselage 125, accessible by someone from the exterior of rotorcraft 101. Handle 2 (H2) 565a comprises external activation handle 509a shown in FIG. 4. According to some embodiments, rotorcraft 101 may also be equipped with sensor 1 (S1) 567a is a sensor that is disposed on a bottom 154a of fuselage 125.

Sensor 1 (S1) 567a is a sensor adapted to detect one or more emergency-related events, e.g., a force of impact, or a flooding, or deployment of flotation devices of the rotorcraft 101. S1 567a is adapted to trigger an activation of emergency kit 301a directly upon detecting an emergency-related event. In other embodiments, S1 567a may be adapted to transmit an alert to the personnel or other occupants of rotorcraft 101, or transmit wirelessly an alert to a controller at a location remote from rotorcraft 101. If S1 567a transmits an alert of an emergency event, then the control system, including control 531a, may be adapted to wait for a response to the alert, before automatically activating the emergency kit 301a. In other embodiments, S1 567a may indicate a multitude of sensors disposed at different locations along the rotorcraft that are adapted to be triggered by either a force of impact, or detection of water, or a sound indicative of an emergency event.

Activation mechanisms (PB1 561a, H1 563a, H2 565a, and S1 567a) are each connected to control 531a. Connection 505a-1 connects PB1561a to control 531a. Connection 505a-2 connects H1 563a to control 531a. Connection 505a-3 connects H2 565a to control 531a. Control 531a is adapted to receive signals to activate emergency kit 301a from any one or more of activation mechanisms, PB1 561a, H1 563A, H2 565a, and S1 567a, and determine to commence activation of emergency kit 301a. Connection 505a-5 connects control 531a to charged bottle 503a.

In other embodiments, different configurations of activation mechanisms are possible. The activation mechanisms PB1 561a, H1 563A, H2 565a, and S1 567a, may be disposed at an exterior of step 201a, or an exterior of emergency kit 301a, or at other locations on or inside rotorcraft 101, or remote from rotorcraft 101. Also, rotorcraft 101 may be equipped with more or fewer activation mechanisms, and rely upon a variety of different technologies (mechanical, magnetic, optical, or otherwise electrical, or a combination), to transmit a request or command to commence activation of emergency kit 301a. Any one, or more, of connections 505a-1, 505a-2, 505a-3, 505a-4, or 505a-5, may be a wired connection such as a cable, a wireless communication path connecting two elements, or a mechanical connection, or a combination of any of the foregoing.

Once a request to activate emergency kit 301a is received, control 531a electrically transmits a signal to charged bottle 503a. When charged bottle 503a receives the signal, charged bottle 503a is adapted to release a fill valve (not shown) on charged bottle 503a. In other embodiments, connection 505a-5 may be mechanical, and control 531a uses connection 505a-5 to mechanically open a fill valve on charged bottle 503a. In other embodiments, control 531a may be part of a larger control system. Control 531a may be further adapted to perform various diagnostics of the charged bottle 503a, and the other components or elements that are directly or indirectly connected to control 531a, and transmit the diagnostic results to displays (not shown) in cockpit 127 or wirelessly to a remote operator.

According to some embodiments, control 531a may be adapted to distinguish between a faulty input (e.g., false activation of H2 565a) and the occurrence of an emergency event by comparing the input with the operation of the other activation mechanisms (e.g., from PB1 561a, H1 563a, or S1 567a). For example, if Handle 2 (H2) 565a is activated by accident, and none of the sensors in S1 567a measure any condition indicative of an emergency event such as sound, water or force of impact), control 531a may alert pilot of faulty activation or request a confirmation from cockpit. If the only inputs received by control 531a are from sensors in S1 567a, then control 531a may be adapted to compare inputs from all the sensors in S1 567a, and trigger activation of emergency kit 301a autonomously in the event of a determination of a likelihood exceeding a certain threshold that the rotorcraft 101 had an emergency water landing or other emergency event.

Control 531a may be further adapted to consider inputs from the various sensors in S1 567a, to run diagnostics and alert when a sensor in S1 567a or other inputs (e.g., PB1 561a, H1 563a, or H2 565a) is malfunctioning; determine a likelihood that an emergency event has occurred (e.g., based on a comparison of inputs from the sensors against a predetermined threshold); and trigger activation of the emergency kit 301a when the input or the likelihood exceeds a certain threshold or preset configuration.

Charged bottle 503a is filled with a pressurized gas, such as air or one or more of any gaseous substances, including oxygen, nitrogen, carbon dioxide, or the like. Once the fill valve is released, charged bottle 503a discharges the gas through a gas duct, such as tube 501a, that is connected at one end to a release (not shown) on charged bottle 503a. A gas via or gas conduct or channel, such as tube 501a, is connected at its other end to a fill port (not shown) on life raft 601a, and the gas inflates life raft 601a. In other words, the gas is discharged in response to an activation signal from control 531a. Control 531a generates the activation signal in response to requests to activate emergency kit 301a from one or more of activation mechanisms 561a, 563a, 565a, or 567a.

Figure 6:
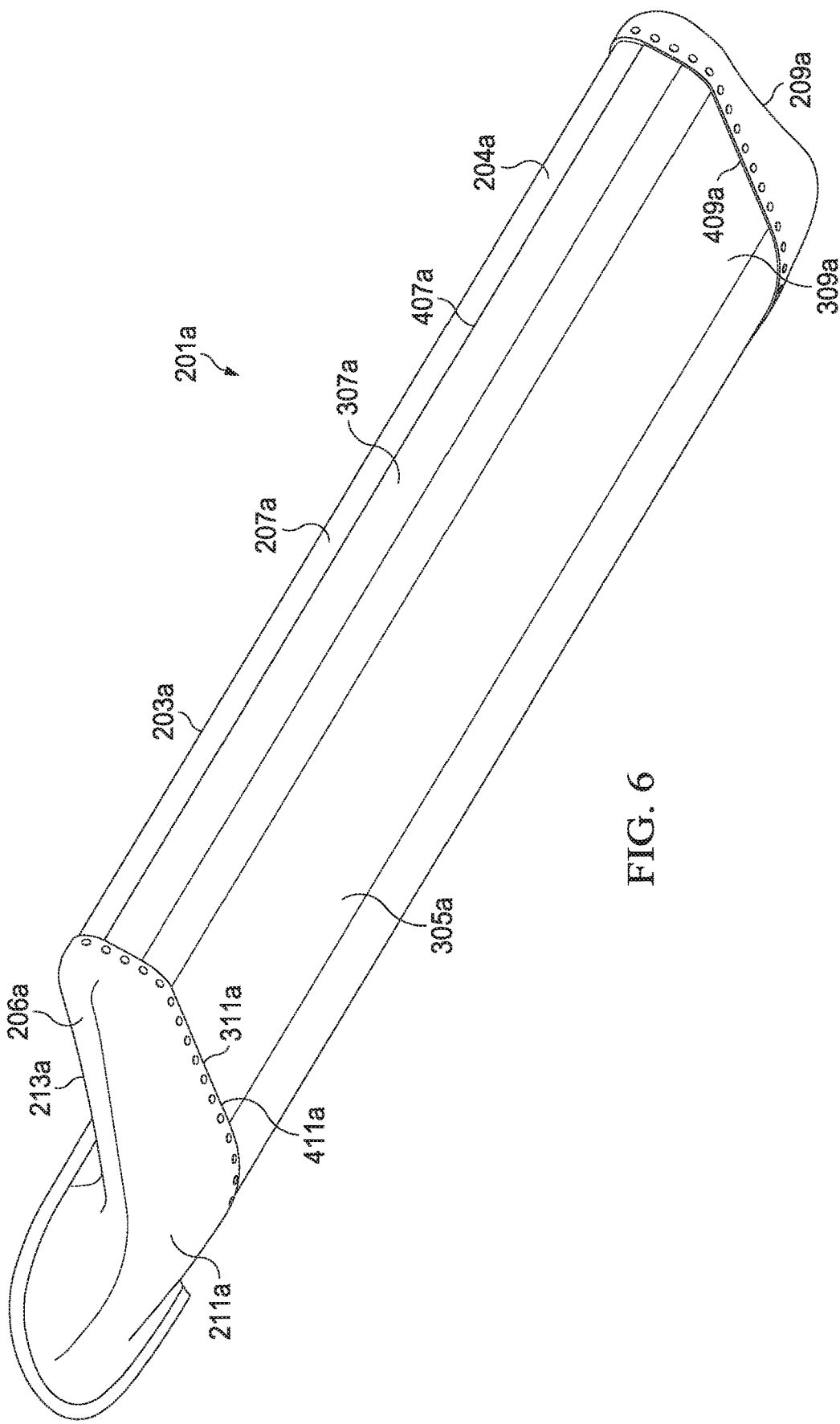
FIG. 6 illustrates a bottom view of a step and emergency kit, according to some embodiments.

FIG. 6 illustrates a bottom view of step 201a, by itself, with emergency kit 301a installed into step 201a, according to some embodiments. Upper panel 203a extends from forward side 204a to aft side 206a. Upper panel 203a has front edge or front side 207a from forward side 204a to aft side 206a. Front side 207a provides a faired surface across step 201a. Container bottom 305a has front edge or front side 307a that is also curved of faired across step 201a. Front side 307a is substantially parallel to front side 207a of upper panel 203a. Container bottom 305a also has forward side 309a and aft side 311a.

Figure 11:
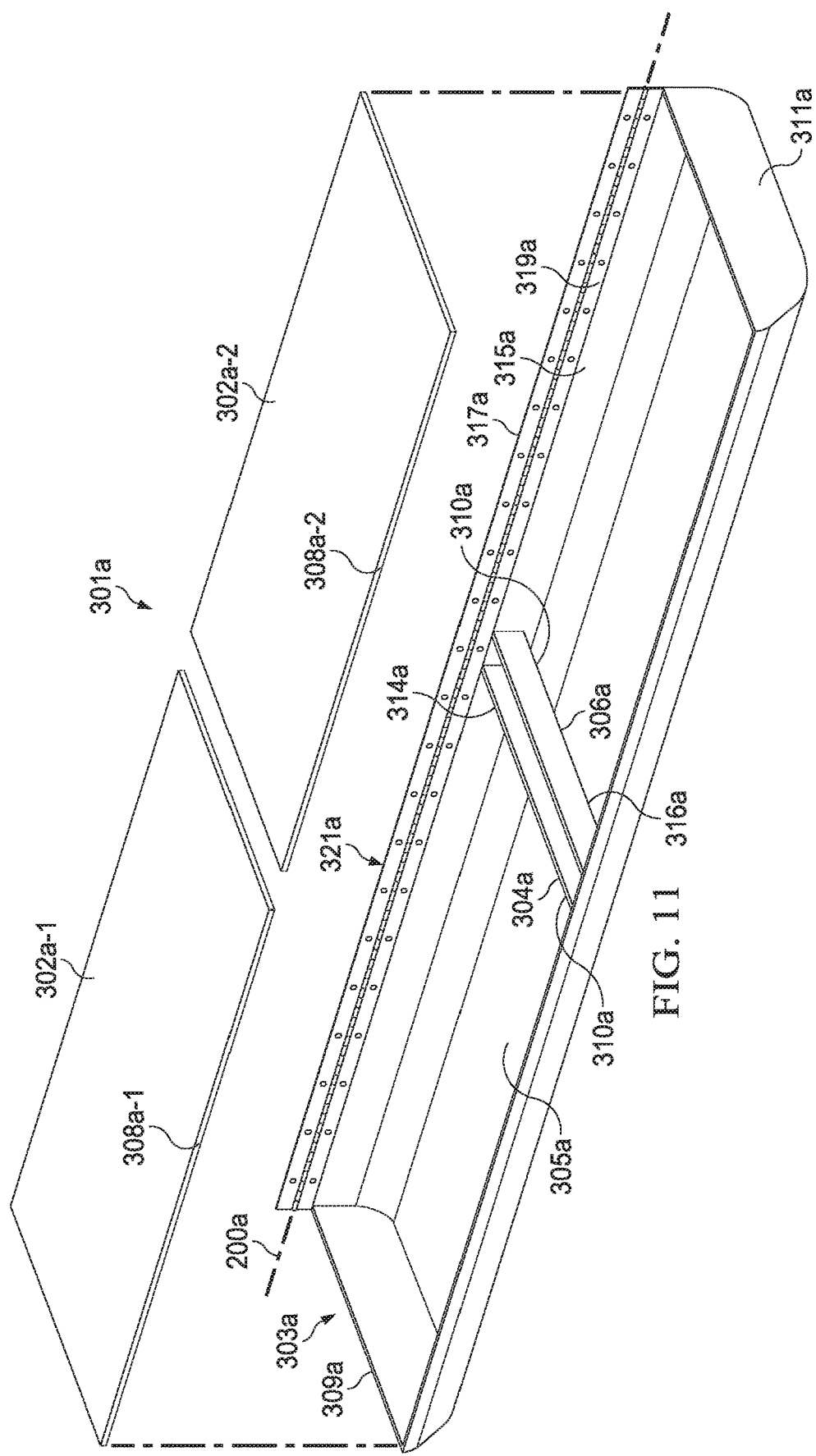
FIG. 11 illustrates a container of an emergency kit, according to some embodiments.
Figure 12:
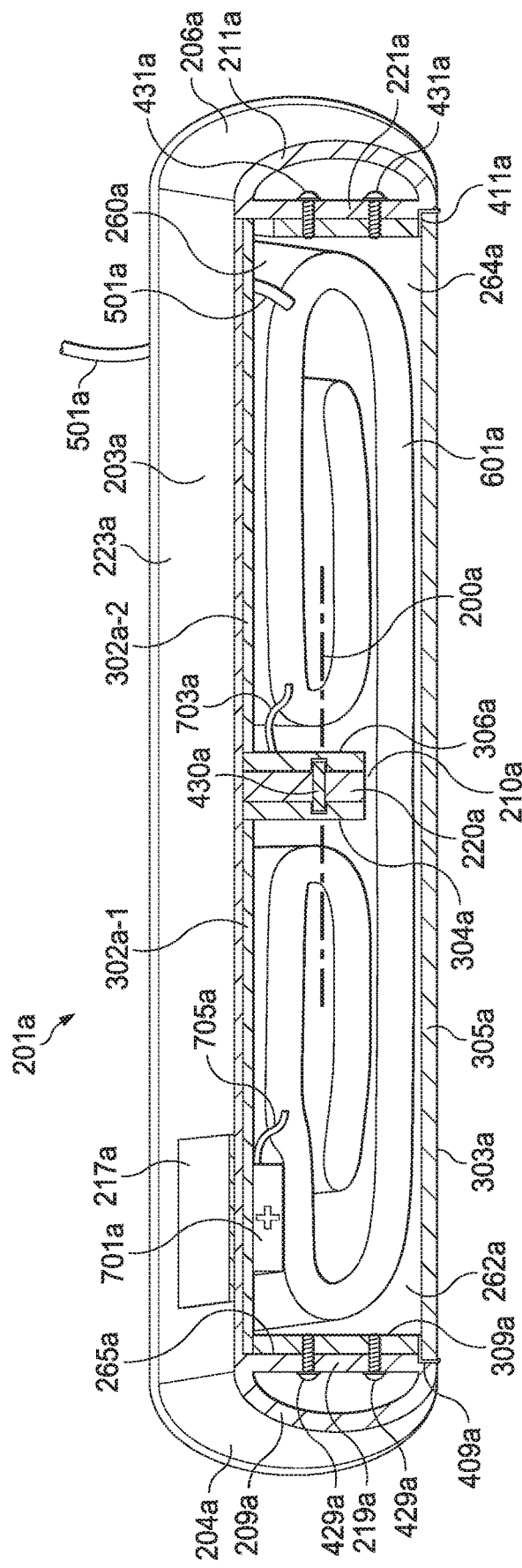
FIG. 12 illustrates a cross-section view of a step and emergency kit, according to some embodiments.
Figure 18:
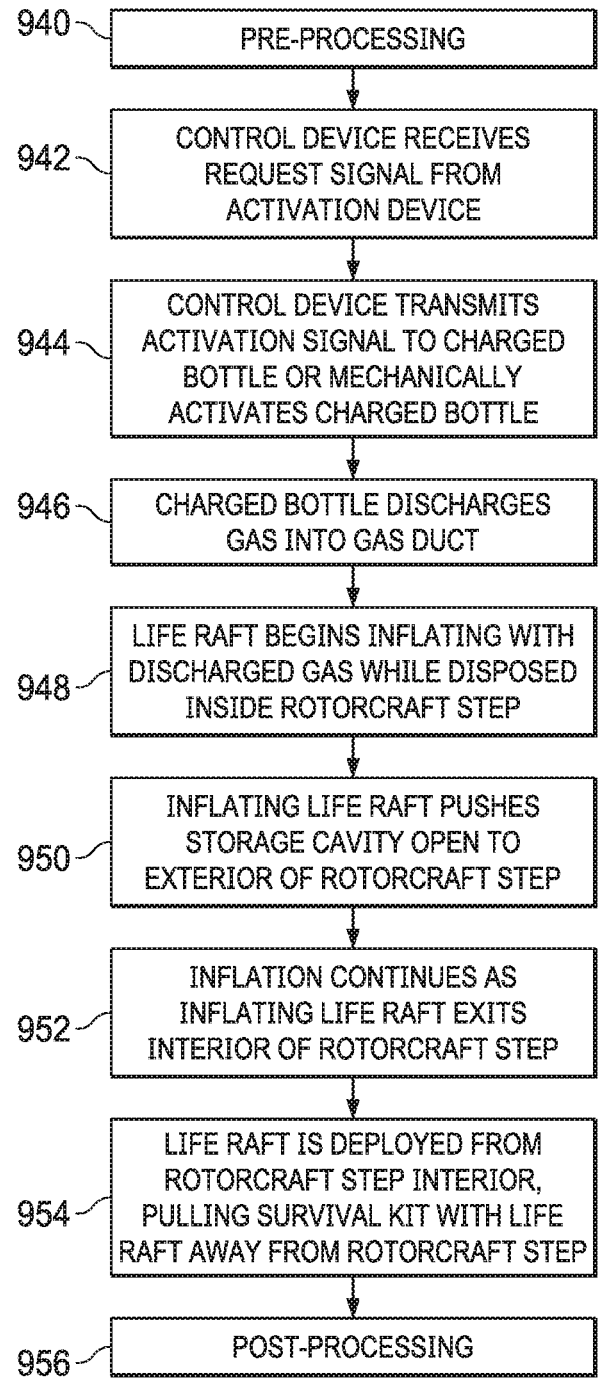
FIG. 18 illustrates a flow diagram of a method of activating the emergency kit and deploying the life raft from the step of the rotorcraft, according to some embodiments.

Front side 207a of upper panel 203a has a lipped shape that overlaps the front side 307a of container bottom 305a. Foam padding 407a, or other materials that are pliable, and water resistant or water proof is applied under and along front side 207a of upper panel 203a, to provide a buffer or cushion between upper panel 203a and container 303a, of which container bottom 305a is visible in FIG. 6. Container bottom 305a is not directly attached to upper panel 203a in FIG. 6. Instead, container bottom 305a is releasably secured to the rest of the container 303a, sometimes referred to as the container body, and it is the other parts of the container in the container body that are used to secure container 303a to a recess of step 201a under upper panel 203a, as illustrated in FIGS. 11, 12, and 18. In addition to foam padding 407a, gasket seals 409a and 411a are applied on upper surfaces of forward side 309a and aft side 311a of container bottom 305a, and along the edges of forward side 309a and aft side 311a. In FIG. 6, gasket seals 409a and 411a can be seen along the edges of forward fairing 209a and aft fairing 211a. Foam padding 407a and gasket seals 4009a, and 411a, each comprises a pliable, or flexible material that is water-proof or water-resistant, to prevent or reduce entry of water or debris into interior of step 201a and into interior of container 303a, while rotorcraft 101 is in routine service. According to some embodiments, gasket seals 409a and 411a, or foam padding 407a, are not attaching or coupling any part of container bottom 305a to the forward side 309a, aft side 311a in the container body, or to the forward rib 219a, or the aft rib 221a of the step 201a.

In other embodiments, instead of foam padding material for foam padding 407a, foam padding 407a, or gasket seals 4009a, and 411a, may alternatively comprise a breakable seal or frangible fasteners, other adhesive material that directly attaches front side 307a of container bottom 305a to front side 207a of upper panel 203a. In that case, the materials used in the seal, fasteners, or other adhesive materials have a tensile strength high enough to couple container bottom 305a to step 201a until torn open by the force from the inflation of life raft 601a from inside container 303a. In any event, wherever referenced in this specification, any attachment mechanism or coupling that is adapted to be releasable may comprise adhesive seals, fasteners, frangible rivets, friction hooks, latches, or other release mechanism, or any combination of the foregoing.

Figure 7:
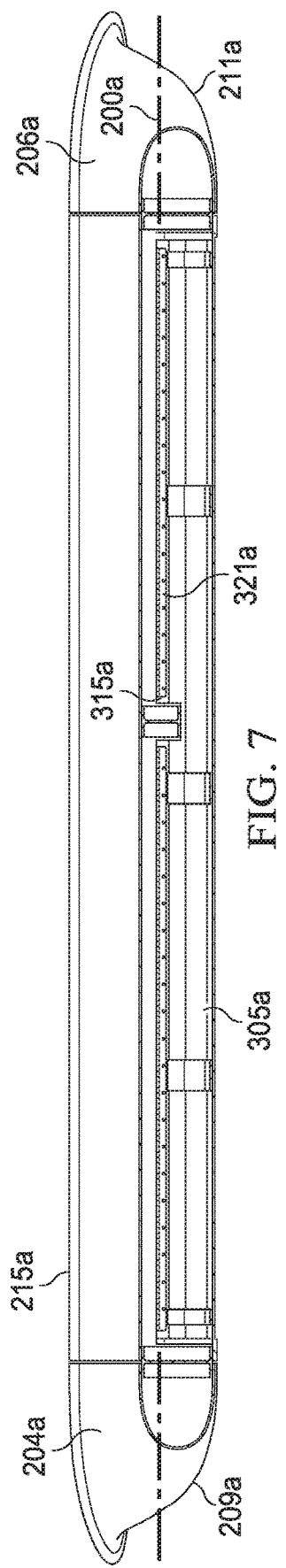
FIG. 7 illustrates a back view of a step and emergency kit, according to some embodiments.

FIG. 7 illustrates a back view of step 201a with emergency kit 301a, according to some embodiments. Step 201a further comprises bottom back fairing 215a extending across the length of step 201a from forward side 204a to aft side 206a. Bottom back fairing 215a interfaces with forward fairing 209a and aft fairing 211a. A hinge 321a pivotally couples back side 315a of container bottom 305a to bottom back fairing 215a. Hinge 321a extends to permit pivoting or rotation of container bottom 305a along axis 200a. According to some embodiments, hinge 321a may be a piano hinge pivotally or hingedly attaching container bottom 305a to bottom back fairing 215a.

In some embodiments, there may be additional components (not shown), e.g., bolts, frangible rivets, adhesives, or other like materials, releasably securing any one or more of the sides of container bottom 305a to step 201a, until activation of emergency kit 301a. In other embodiments, container bottom 305a may instead be adapted to break away from the rest of container 303a, that is referred to as container body. In that event, container bottom 305a breaks away or is otherwise pushed or pulled away from hinge 321a, as a result of a release of fasteners (not shown) attaching container bottom 305a to hinge 321a. In further embodiments, container 303a may not have any hinge, and instead container bottom 305a is pulled out, pushed out, or broken away from container 303a along all four sides of container bottom 305a, by a force arising from activation of emergency kit 301a, that breaks or tears all attachments of container bottom 305a to the rest of container 303a, sometimes also referred to as the container body.

Figure 8:
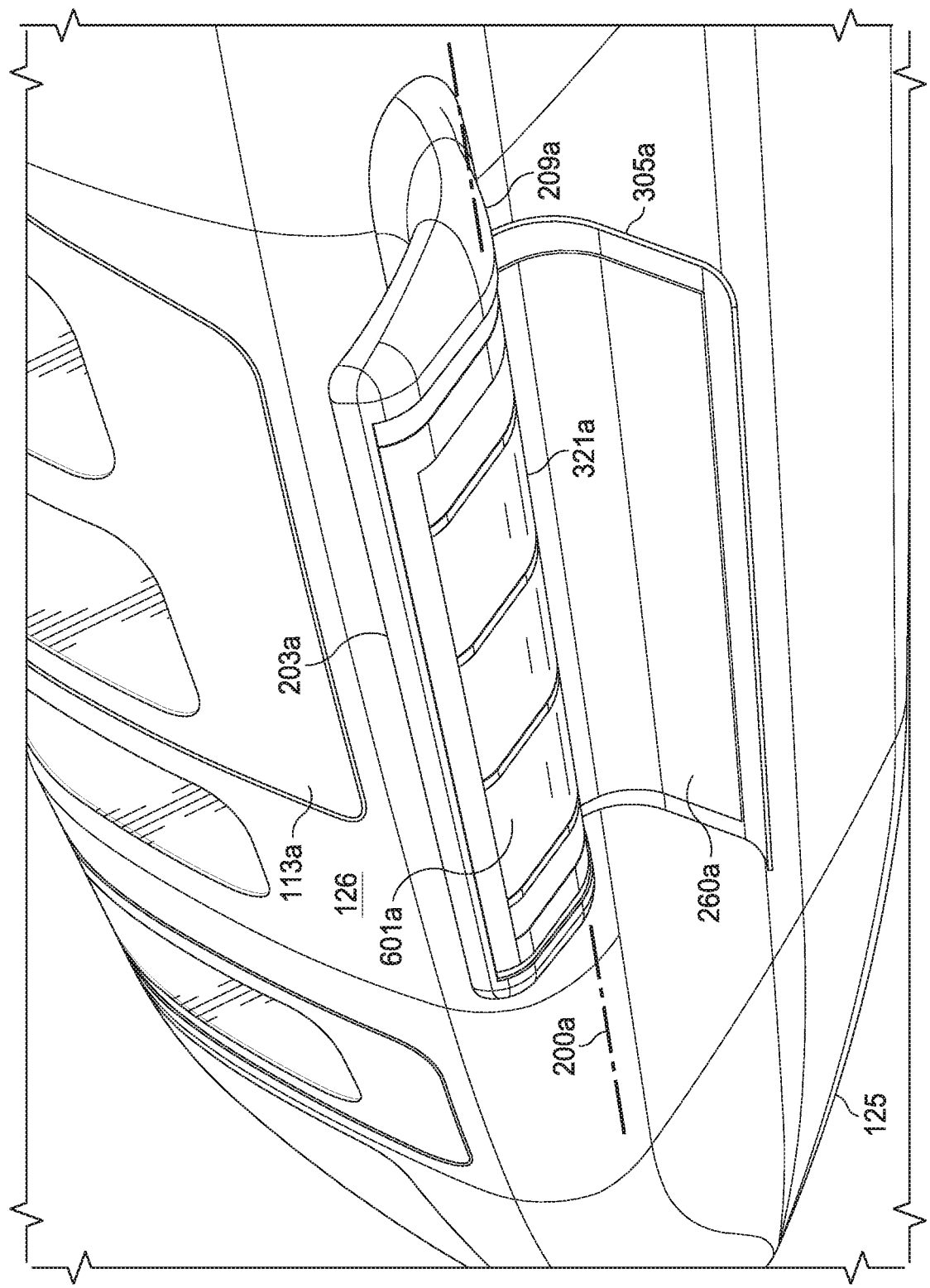
FIG. 8 illustrates a side view of a step and opened emergency kit on a rotorcraft, according to some embodiments.

FIG. 8 illustrates a side view of step 201a with opened emergency kit 301a, according to some embodiments. In FIG. 8, container 303a is open away from step 201a, opening at hinge 321a along axis 200a, and showing how life raft 601a is arranged inside step 201a, while deflated. Like a clam shell or door opening, the dropping down of container bottom, at hinge 321a away from upper panel 203a, and away from a container top, such as container lids 302a-1, 302a-2 (illustrated in FIG. 11, but not visible above life raft 6001a in FIG. 8), exposes or opens interior of storage cavity 260a to an exterior of step 201a. This movement of container bottom 305a permits life raft 6001a to inflate and deploy from step 201a, even when container bottom 305a is underwater, as further described below.

Figure 9:
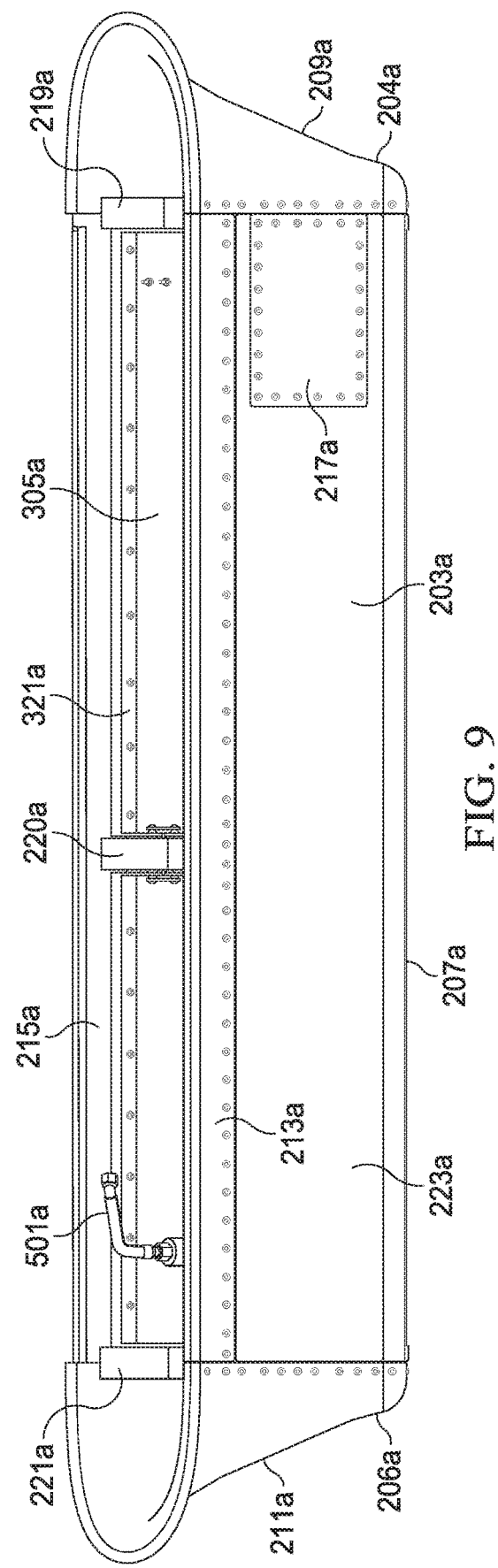
FIG. 9 illustrates a top view of a step and an emergency kit, according to some embodiments.

FIG. 9 provides a top view of step 201a with emergency kit 3010a, according to some embodiments. The view shows a part of tube 501a and the supports that enable step 201a to bear the step load for ingress and egress associated with routine use of rotorcraft 101, and when occupants are evacuating rotorcraft 101 after an emergency water landing.

Supports of upper panel 203a disposed inside step 201a comprise ribs 219a, 220a, 221a, that may also be referred to as spars. Upper panel 203a is attached to ribs 219a, 220a, 221a. Forward rib 219a is disposed at forward side 204a of step 201a. Middle rib 220a is disposed between forward rib 219a, and aft rib 221a, at a location inside step 201a, substantially midway across step 201a. Ribs 219a, 220a, 221a are considered, in some embodiments, as the existing support structure for step 201a at all times. Thus, ribs 219a, 220a, 221a, support the step load before installation of emergency kit 301a into step 201a, while emergency kit 301a is installed into step 201a, and after activation of emergency kit 301a from step 201a.

Figure 10:
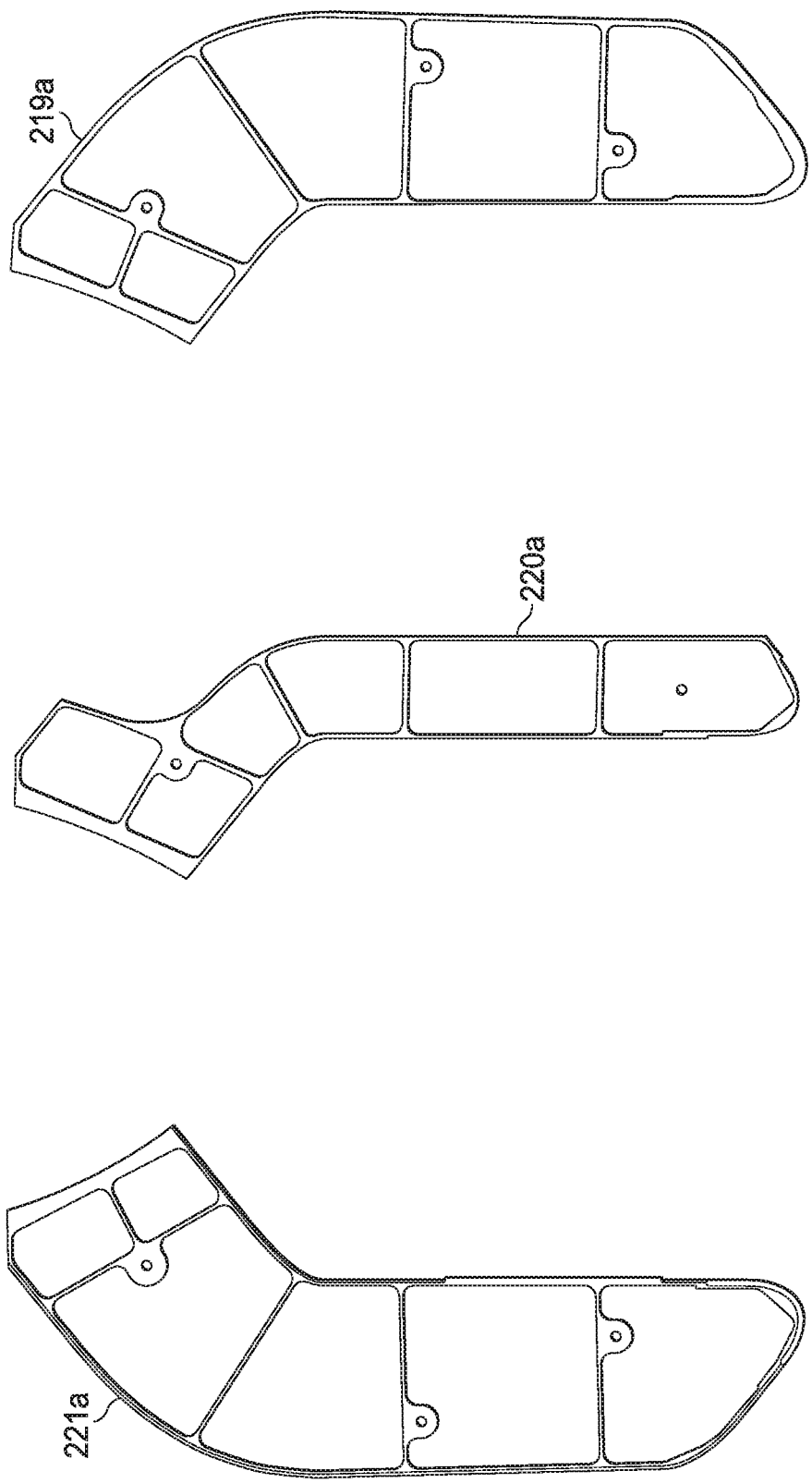
FIG. 10 illustrates step supports, according to some embodiments.

FIG. 10 illustrates the step supports, by themselves, according to some embodiments. Middle rib 220a is narrower than forward rib 219a and aft rib 221a. Since middle rib 220a is narrower, middle rib 220a does not extend completely across interior of step 201a. Instead, the configuration of middle rib 220a provides a channel under middle rib 220a in the interior of step 201a, as further described below.

FIG. 11 illustrates container 303a, according to some embodiments. In addition to container bottom 305a, container 303a further includes container lids 302a-1 and 302a-2, forward side 309a, aft side 311a, mid span support 3100a, and back side 315a, all attached to container bottom 305a. Forward side 309a, aft side 311a, mid span support 3100a, and back side 315a extend upwards from container bottom 305a. Fasteners (not shown) that are adapted to be releasable upon application of force, attach front side 307a of container bottom to container lids 302a-1, and 302a-2.

Container bottom 305a may comprise steel, aluminum, or another metal or other material that may match or differ from the material comprising skin 126, upper panel 203a, forward fairing 209a, aft fairing 211a, upper back fairing 213a, or bottom back fairing 215a. Container bottom 305a may be referred to as the container door, since container bottom 305a pivots at hinge 321a, like a door. The rest of the container 303a may be referred to as the container body, with the container body comprising the container lids 302a-1 and 302a-2, forward side 309a, aft side 311a, mid span support 3100a, and back side 315a. All of container 303a may also be referred to as the envelope or packaging for the contents of emergency kit 301a to be installed into step 201a (e.g., life raft 6001a and survival kit 701a).

Mid span support 3100a comprises middle plates 304a, 306a. Back side 315a of container 303a comprises hinge 321a, with upper leaf 317a above hinge 321a, and lower leaf 319a below hinge 321a. Upper leaf 317a on back side 315a of container 303a secures or otherwise attaches back side 315a to bottom back fairing 215a of step 201a (identified, e.g., in FIGS. 7 and 9), with bolts, nails, screws, adhesives, rivets or other means of attachment. Hinge 321a permits pivoting or rotation of container bottom 305a along axis 200a away from container lids 302a-1, 302a-2. Front side 307a of container bottom 305a is releasably attached with fasteners or other attachment or coupling mechanisms or materials to front sides 308a-1, 308a-2 of container lids 302a-1, 302a-2, that are adapted to be released or uncoupled upon application of force, e.g., in the event of activation of emergency kit 301a. The other sides of container lids 302a-1, 302a-2 are attached with fasteners or other attachment mechanisms or materials (not shown) to the rest of the container body, e.g., the forward side 309a and aft side 311a, and in some embodiments, also mid span support 3100a.

In some embodiments, container lids 302a-1 and 302a-2, forward side 309a, aft side 311a, and middle plates 304a, 306a, may comprise a material more lightweight or less dense than container bottom 305a. For example, if container bottom 305a comprises steel, container lids 302a-1 and 302a-2, forward side 309a, aft side 311a, and back side 315a may comprise a lighter weighted aluminum alloy. Forward side 309a and aft side 311a may comprise a gusset that is formed from a polymer or other flexible material having a triangular or wedge shape that is wide enough at its outer side to expand as container bottom 305a pivots or opens downwards. One side of the wedge of the material is attached at one end to forward rib 219a or aft rib 221a, and the adjoining side is attached to container bottom 305a along the width of container bottom 305a. The material remains folded up inside forward rib 219a and aft rib 221a until activation of emergency kit 301a, when they expand to their full wedge shape as container bottom 305a swings open, in a movement similar to a clam shell opening. In other embodiments, container bottom 305a comprises the same material as other parts of container 303a, that may be referred to as container body.

In other embodiments, instead of container lids 302a-1, 302a-1, there is a one-piece container lid that is bent to fit beneath and around middle spar 220a. In yet further embodiments, container 303a may be installed without container lids 302a-1 and 302a-2. Then, once installed, the lidless container may resemble a shape of an open tray or box attached to the interior and underside of step 201a. The absence of a container lid may increase available space and make the contents of emergency kit 301a easily accessible after installation.

Provided that materials comprising parts of the container 303a and their couplings and attachments maintain structural integrity to secure contents of emergency kit 301a in step 201a prior to activation of emergency kit 301a, the materials may separate from one another or even fail unintentionally upon activation of the emergency kit 301a. For example, in other embodiments, instead of, or in addition to, dropping open, container bottom 305a or rest of container 303a can separate from rotorcraft 101 when life raft 601a is deployed from step 200a.

FIG. 12 illustrates a cross section of step 201a and emergency kit 301a, according to some embodiments. Emergency kit 301a is installed into recess 265a of step 201a. Recess 265a is defined with interior surfaces of step 201a (e.g., interior or bottom surfaces of upper panel 203a, and ribs 219a, 220a, and 221a, as further illustrated in FIG. 15, and described below). The container 303a is dimensioned to fit into recess 265a. A storage cavity 260a inside container 303a is defined by the interior surfaces of the container 303a (e.g., container lids 302a-1 and 302a-2, container bottom 305a, back side 315a, forward side 309a, aft side 311a, and middle plates 304a, 306a). In other embodiments, when there is no container lid, but container 303a is configured like an open tray or open box, installation of emergency kit 301a into step 201a defines storage cavity 260a in the interior by forming a periphery with interior surfaces of step 201a (e.g., upper panel 203a, and ribs 219a, 220a, 221a), and interior surfaces of container 303a (e.g., container bottom 305a, back side 315a, forward side 309a, aft side 3n1a, and middle plates 304a, 306a).

As illustrated in FIG. 12, storage cavity 260a below container lids 302a-1, 302a-2, and above container bottom 305a, is made up of forward volume 262a, channel 210a between middle rib 220a and container bottom 305a, and aft volume 264a on the opposite side of channel 210a. Storage cavity 260a provides a continuously uninterrupted open space between the forward side 309a and aft side 311a of container 303a, to fit within storage space available in the interior structure of step 201a. The storage space that is available in the interior structure of step 201a comprises the recess 265a that substantially spans a length of step 201a, from forward side 204a to aft side 206a of step 201a.

FIG. 12 also shows, according to some embodiments, the gasket seals 409a and 411a that are applied or otherwise disposed between container bottom 305a, and the bottoms of the forward rib 219a, aft rib 221a on step 201a, and the bottoms of the forward side 309a, and aft side 311a on container 303a. As shown, container bottom 305a has a lipped shape with a portion of container bottom 305a covering the bottom of forward side 309a and aft side 311a, and extending to also cover a part of the bottom, or the entire bottom of forward rib 219a and aft rib 221a on step 201a. In this way, container bottom 305a provides a bottom cover of joints between container 303a and step 201a. As indicated above, gasket seals 409a and 411a prevent or reduce entry of debris or water into interior of container 303a, and also into interior of step 201a and joint or any spacing between step 201a and container 303a.

As shown in FIG. 12, life raft 601a is deflated, and folded, rolled or otherwise packed into or otherwise stored in storage cavity 260a. Survival kit 701a is shown as being disposed on top of a portion life raft 601a, and separately accessible through upper access panel 217a. In other embodiments, survival kit 701a may instead be disposed to the side of life raft 601a, and still separately accessible through upper access panel 217a. The arrangement and positioning of survival kit 701a depends on the size of step 201a, size of life raft 601a, size of survival kit 701a, and packing or other arrangement of life raft 601a and survival kit 701a in emergency kit 301a.

Tether 706a couples survival kit 701a to life raft 601a, so that survival kit 701a is pulled out by the life raft 601a, as the life raft 601a deploys from the step 201a, and the survival kit 701a remains attached to the life raft 601a after activation of emergency kit 301a. Life raft 601a has tether 703a coupling life raft 601a to upper panel 203a, or another part of step 201a or container 303a. Life raft 601a, when deflated, is folded or otherwise arranged on container bottom 305a in container 303a, so that life raft 601a fits inside storage cavity 260a when emergency kit 301a is installed into step 201a. This arrangement of life raft 601a also enables the life raft 601a, as it inflates, to unfurl or unfold from inside step 201a, in a manner that pushes container bottom 305a away from container lids 302a-1, 302a-2, and away from upper panel 203a, and opens the storage cavity 260a to an exterior of step 201a. An arrangement of life raft 601a may be referred to, according to some embodiments, as a folding of life raft 601a, or a packing of life raft 601a in emergency kit 301a.

In some embodiments, forward volume 262a and aft volume 264a are substantially equal, so that the arrangement of life raft 601a and survival kit 701a can distribute or balance the weight between the forward side 204a and aft side 206a of step 201a. Forward rib 219a and aft rib 221a extend from upper panel 203a to container bottom 305a. Middle rib 220a starts at bottom surface of upper panel 203a, but does not extend down all the way to container bottom 305a. Instead, channel 210a is formed, or disposed, in spacing between middle rib 220a and container bottom 305a. Channel 210a provides a mid-span connection between forward volume 262a to aft volume 264a. Channel 210a is wide enough to permit a portion of life raft 601a near a middle of life raft 601a to fit through channel 210a. The disposition of storage cavity 260a permits a greater portion of recess 265a in interior of step 201a to be available for accommodating emergency kit 301a. Despite the weight added by emergency kit 301a, utilizing the entirety of storage cavity 260a balances the added weight throughout step 201a. With a similar balancing of emergency kit 301b through step 201b (previously identified in FIG. 2), emergency kits 301a, 301b do not substantially alter or modify the handling of rotorcraft 101, after installation into steps 201a, 201b.

In some embodiments, container lid comprises two pieces 302a-1, 302a-2 that are interrupted in the middle where the middle rib 220a and mid span support 310a are located. Container lid 302a-1 covers forward volume 262a and container lid 302a-2 on the other side of middle rib 220a and mid span support 310a covers aft volume 264a. In other embodiments, instead, there may be a one piece container lids (not shown) with a middle portion that runs below and around middle rib 220a, and mid span support 3100a, and channel 210a extends between the lower middle portion of a one piece container lid and container bottom 305a. In any event, as used herein, any reference to a "container lid" is intended to cover any and all of the above embodiments (one piece or multi-piece).

Rivets, bolts or other attachments and structures are used to secure container 303a to step 201a until activation of emergency kit 301a, with inflation of life raft 601a from interior of step 201a. For example, bolts 429a attach forward side 309a of container 303a to forward rib 219a, on the interior of forward rib 219a. Similarly, bolts 431a attach aft side 311a of container 303a to aft rib 221a, on the interior of aft rib 221a. A center support 430a through middle rib 220a supports or holds middle plates 304a, 306a on either side of middle rib 220a, such as a hook or pin. Tube 501a is connected to life raft 601a inside storage cavity 260a (and as previously illustrated in FIG. 4, according to some embodiments, extends to be connected to charged bottle 503a).

Figure 13:
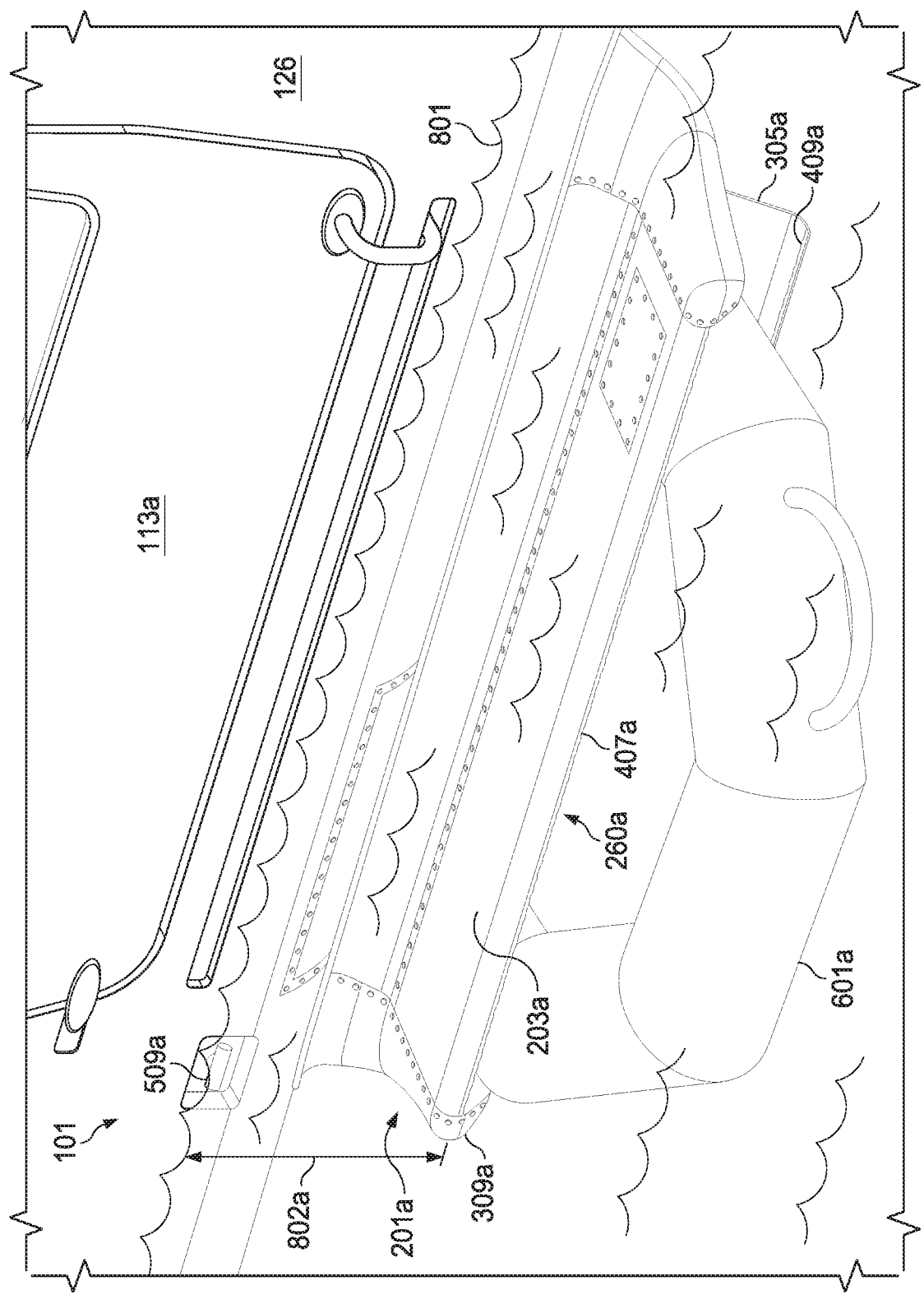
FIG. 13 illustrates a step with an emergency kit opened by an inflating life raft, according to some embodiments.
Figure 14:
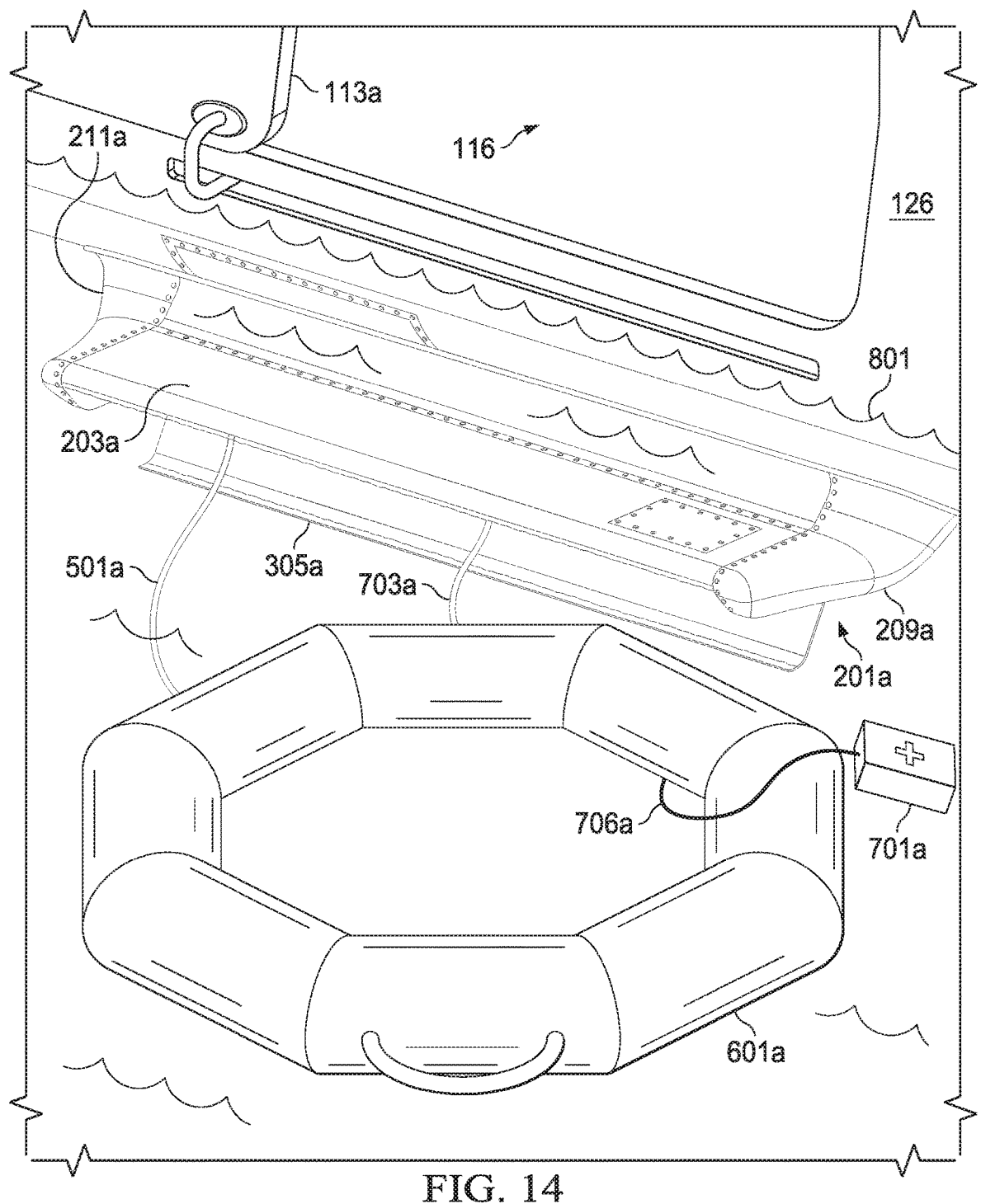
FIG. 14 illustrates the step and emergency kit, after deployment of the life raft from the step, according to some embodiments.

FIGS. 13-14 illustrate the stages that follow or can be considered a part of activation of emergency kit 301a, in some embodiments, deploying the life raft 601a includes inflating life raft 601a, opening storage cavity 260a to an exterior of step 201a, deploying life raft 601a from step 201a, boarding life raft 601a and releasing life raft 601a from rotorcraft 101. An event, such as an emergency landing of rotorcraft 101 on water 801 can trigger activation of emergency kit 301a. However, the emergency kit 301a can be activated in other circumstances.

Activation of emergency kit 300a initiates inflation of life raft 601a in emergency kit 301a while the life raft 601a is disposed in storage cavity 260a in step 201a. Pressure or other force from the expansion of life raft 601a while it is being inflated, is applied against the enclosure of storage cavity 260a. Once the force exceeds a pre-determined strength of the material comprising fasteners between container bottom 305a and the rest of the container 303a (or container body), the container bottom 305a is uncoupled or released from the rest of the container 303a. The force from inflation of the life raft 601a pushes container bottom 305a downward and away from the rest of container 303a and away from upper panel 203a. This force may be sufficient, even while step 201a is at a depth 802a below the surface of water 801, to break open the storage cavity. In other embodiments, rotorcraft 101 may be equipped with other means of opening step 201a and deploying life raft 601a, either as a backup to the above-described mechanisms or as an alternative to them. For example, container bottom 305a may have a handle or knob that permits an occupant to manually open container bottom 305a, and another knob or tube permitting manual or other inflation or otherwise pumping gas into life raft 601a.

As life raft 601a continues to expand while being inflated, life raft 601a is released and floats to the surface of water 801. Tube 501a continues to channel discharged gas into life raft 601a until all available gas is discharged into life raft 601a, or life raft 601a is sufficiently inflated (according to a control mechanism, not shown, at life raft end of tube 501a). Tether 703a secures life raft 601a to step 201a. Tether 706a secures survival kit 701a to life raft 601a, and can be used to pull survival kit 701a into interior of life raft 601a. Occupants can evacuate rotorcraft 101 from passenger compartment 116 through passenger door 113a. Upper panel 203a on step 201a continues to be supported and able to bear a step load after deployment of life raft 601a. So, occupants can use upper panel 203a on step 201a to board life raft 601a while life raft 601a is tethered to step 201a.

In some embodiments, once boarding is complete, life raft 601a can be released from tether 703a by unlocking or releasing a coupling between tether 703a and life raft 601a, such as releasing a mechanical fuse in life raft 601a (not shown). In other embodiments, life raft 601a can be manually released from tether 703a by occupants once they have boarded life raft 601a, by cutting tether 703a or disconnecting life raft 601a from tether 703a.

Rotorcraft 101 may be separately equipped with emergency floats or other floatation devices that are activated to prevent rotorcraft 101 from sinking after an emergency water landing (not shown). Even after emergency floats are appropriately inflated or deployed, step 200a may sit at depth 802a of up to approximately one foot under the surface of water 801. Even when step 201a is below water, emergency kit 301a is configured to be activated and inflate and deploy life raft 601a underwater. Occupants can rely on stability and support of upper panel 203a and the rest of step 201a, even when submerged underwater, to support their step load when disembarking rotorcraft 101 and boarding life raft 601a.

Figure 15:
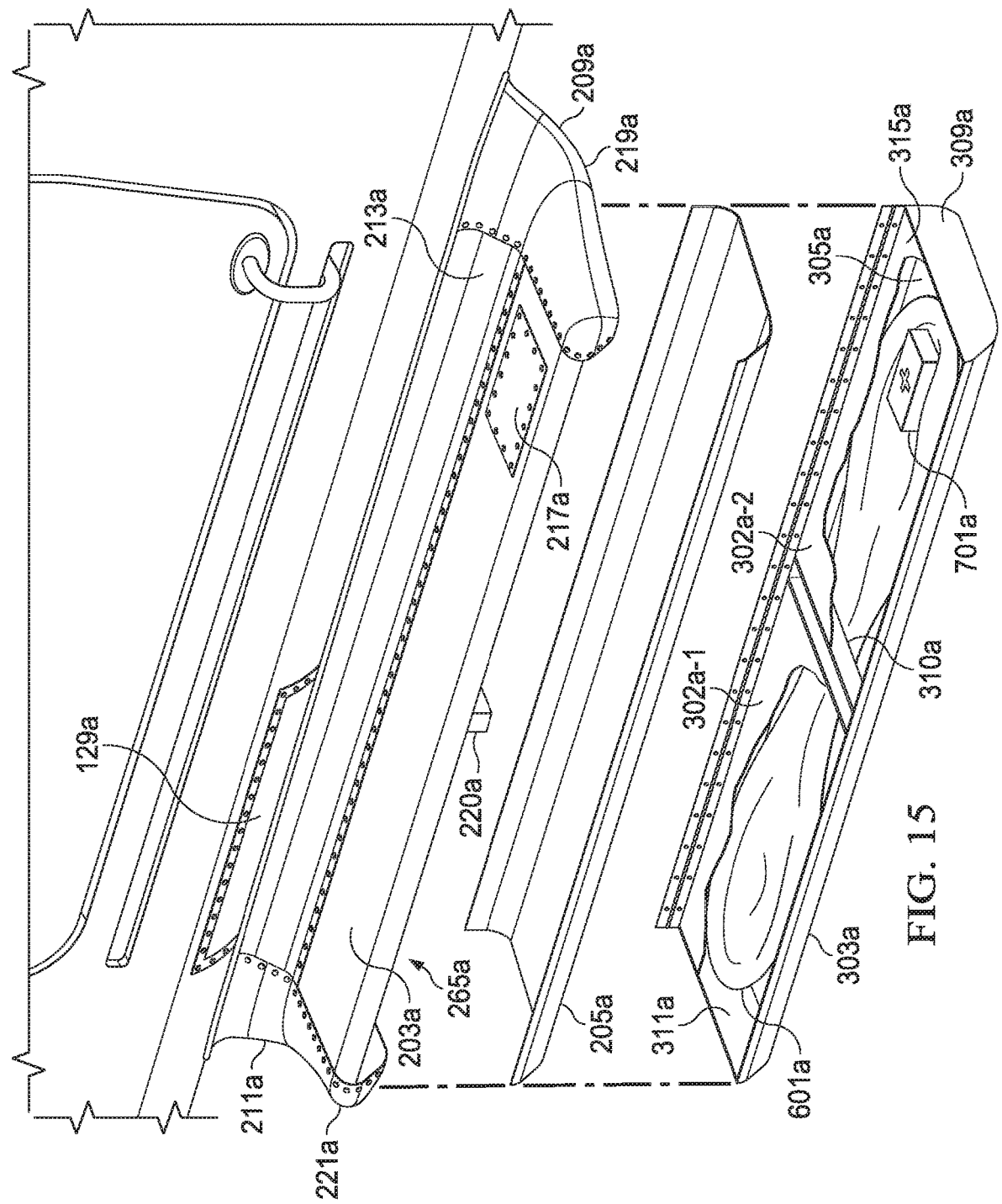
FIG. 15 illustrates parts involved in installation of emergency kit into step and removal of emergency kit from step, with cutaways in the container lid, according to some embodiments.

FIG. 15 illustrates parts involved in installation of emergency kit 301a into step 201a, and removal of emergency kit 301a from step 201a, according to some embodiments. Emergency kit 301a is configured for portability and recycling. Emergency kit 301a can be installed into a step 201a on rotorcraft in an existing fleet. Also, if rotorcraft 101 will no longer require emergency kit 301a, step 201a can be reconfigured without emergency kit 301a. Then, the emergency kit 301a can be used on a different rotorcraft.

For installation into step 201a, bottom panel 205a can be removed, by unscrewing bolts or other attachments (not shown) used to secure bottom panel 205a to step 201a. Removal of bottom panel 205a creates recess 265a at the underside of the interior of step 201a. Life raft 601a and survival kit 701a are arranged on container bottom 305a in container 303a, so that container 303a can be inserted into recess 265a on underside of step 201a.

Once inserted, mid span support 310a is engaged with middle rib 220a, and container is attached to step 201a by attaching forward side 309a to interior of forward rib 219a and aft side 311a to interior of aft rib 221a. Tubes and other parts (not shown) are connected to emergency kit 301a after installation. In some embodiments, bottom panel 205a is replaced with a surface of container bottom 305a. Then, bottom panel is not reattached after installing emergency kit 301a into step 2001a.

These embodiments simplify the process to remove emergency kit 301a from step 201a. In order to remove emergency kit 3010a, container 303a is detached and unhooked or uncoupled from ribs 219a, 220a, 221a, releasing emergency kit 301a from step 201a (e.g., by removing bolts or other attachments between them). The underside of step 201a can be covered again by bottom panel 205a that covers recess 265a and replaces container bottom 305a.

According to some embodiments, container bottom 305a, as a replacement of bottom panel 205a, is shaped or profiled substantially the same as, or to substantially mirror, the shape, contour or profile of bottom panel 205a. This shaping or profile maximizes or otherwise optimizes usage of space available in step 201a. Additionally, the use of a container bottom 305a that duplicates the shape of bottom panel 205a permits the OML and other exterior surfaces of step 201a to remain substantially unchanged or undisturbed, whether emergency kit 301a is installed in step 201a, or absent from step 201a. The ability to maintain the OML or profile of step 201a, and of rotorcraft 101, reduces the impact of the emergency kit 301a on the handling of rotorcraft 101. The similar handling of rotorcraft 101, whether emergency kit 301a is removed from or installed into step 201a (until activated), integrates emergency kit 301a with step 201a.

In other embodiments, container 303a can be configured and used differently during installation. For example, container 303a may sit completely inside step 201a (with life raft 601a and survival kit 701a inside). Bottom panel 205a is reapplied, after inserting emergency kit 301a. Bottom panel 205a covers and encloses all of emergency kit 301a inside step 201a. Alternatively, the container 303a (or parts of container 303a) may be removable once life raft 601a and survival kit 701a are inserted into step 201a. Then, bottom panel 205a is reattached to enclose life raft 601a and survival kit 701a in step 201a.

Figure 16:
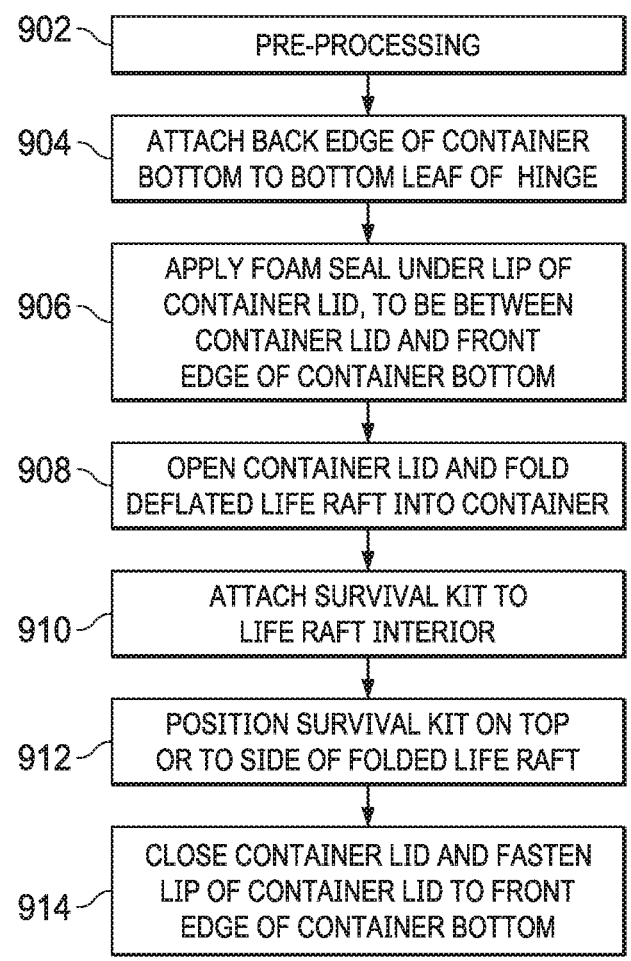
FIG. 16 illustrates a flow diagram of a method of configuring an emergency kit, so that the emergency kit can be installed into the step of the rotorcraft, according to some embodiments.
Figure 17:
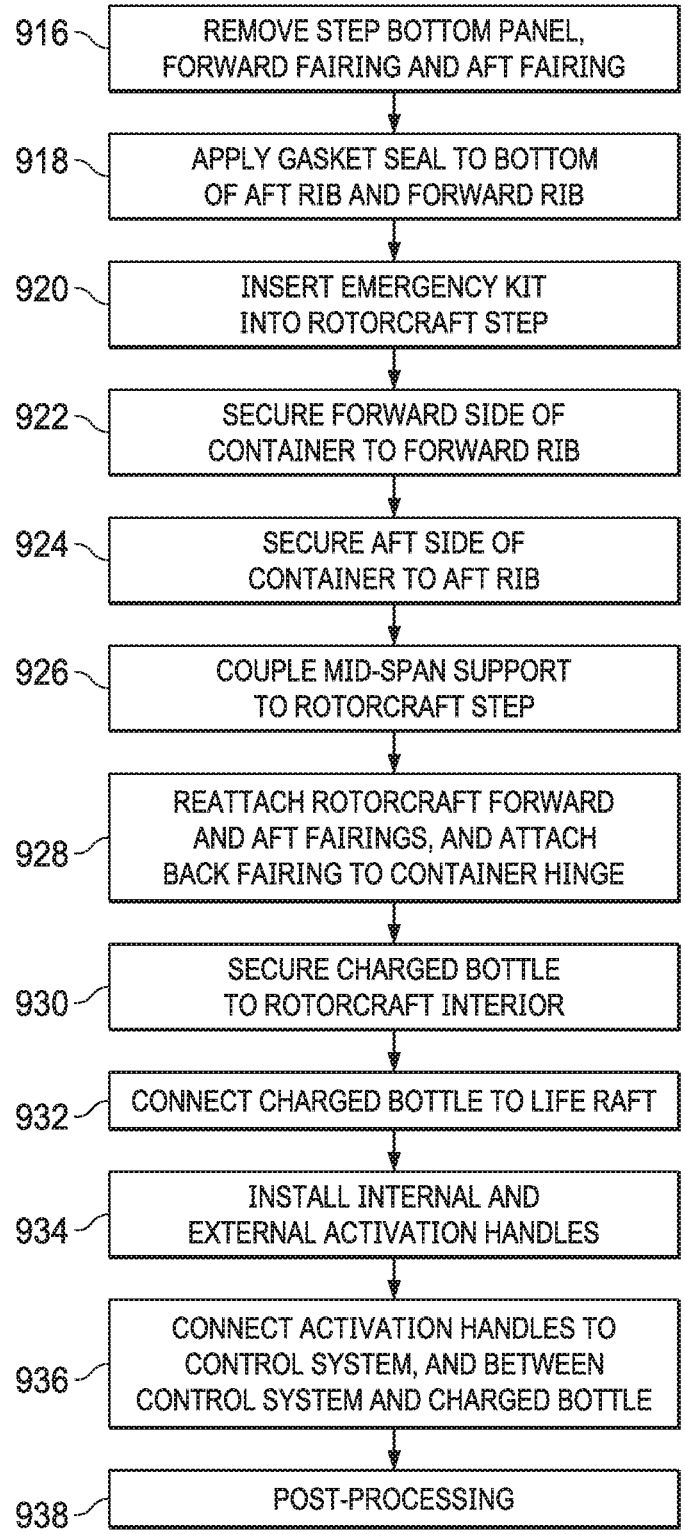
FIG. 17 illustrates a flow diagram, continuing from FIG. 16, of a method of installing the emergency kit into the step of the rotorcraft, according to some embodiments.

FIGS. 16-18 illustrate methods of assembling and installing emergency kits into steps of rotorcrafts, and then activating emergency kits, including inflation and deployment of life rafts, in the event of an emergency water landing, in accordance with some embodiments. It should be understood that the term "rotorcraft step" refers to a step on the exterior of a rotorcraft. Also, while there are some details below giving some specific examples of how sequence of some blocks in the method may be altered or occur simultaneously in other embodiments, it should further be understood that any different sequence or simultaneous performance of any one or more of the blocks described in this specification are possible in other embodiments.

FIG. 16 illustrates the method for assembling and making of the emergency kit, according to some embodiments. Block 902 includes pre-processing, e.g., manufacturing, or otherwise preparing, components of the emergency kit for assembly, including the life raft itself, the survival kit, the ELT, and the container. In block 904, a hinge assembly is attached to a back side of container bottom of a container. In block 906, a foam seal is applied under the lip of the container lid, to be between container lid and front edge of container bottom. In other embodiments, the foam seal may be applied to the container bottom or otherwise disposed between container bottom and container lid. In block 908, a container lid is opened, and the deflated life raft is rolled, or otherwise folded or arranged into the container in a configuration that fits inside the recess in the interior of the rotorcraft step. In block 910, a survival kit is attached with a tether to an interior of the life raft. In block 910, the survival kit is positioned on a top surface of the folded life raft, or to the side of the folded life raft, on the forward side of the container. In some embodiments, this positioning of the survival kit makes the survival kit separately accessible from the life, after installation, through an access panel on an upper panel on the rotorcraft step. In block 914, the container lid is closed, the lip of the container lid is fastened to the front edge of the container bottom with a releasable coupling or attachment that is adapted to be released upon an application of force, e.g., from an activation of the emergency kit.

FIG. 17 illustrates the method for installing the emergency kit into a rotorcraft step, according to some embodiments. In block 916, a bottom panel, and a forward fairing, and an aft fairing are removed from the rotorcraft step. In block 918, a gasket seal is applied to the bottom of the aft rib and the forward rib, to cover or seal the area that is between the ribs, and the unhinged container bottom forward and aft edges that extend beneath the ribs, and provide a debris or water resistant or proofing, and buffer or cushioning between the container bottom sides, and the forward and aft sides of the container and the forward and aft ribs of the rotorcraft step.

In block 920, the emergency kit is inserted into an underside of the rotorcraft step, into the recess created within the interior of the rotorcraft step after removal of the bottom panel. In block 922, the forward side of the container body is secured to the forward rib of the rotorcraft step by driving fasteners (e.g., rivets or screws) through the forward rib of the rotorcraft step and the forward side of the container body. In block 924, the aft side of the container body is secured to the aft rib of the rotorcraft step by driving fasteners through the aft rib of the rotorcraft step and the aft side of the container body. In block 926, the mid span support of the container body is coupled to the rotorcraft step. In some embodiments, the coupling may include hanging mid span supports of the container onto pins on opposing sides of the middle rib of the rotorcraft step. In block 928, the forward and aft fairings are reattached to the rotorcraft step, and the back fairing is attached to the hinge on the container. In other embodiments, edges of the container bottom may be attached or coupled to the ribs, or to the upper panel on the rotorcraft step, with a material or adhesive or mechanism that is breakable, tearable or otherwise released upon an application of force when the container has a different configuration, e.g., by being configured without a container lid, or a container hinge.

Other embodiments may include an application of another seal thereafter, to cover where the unhinged edges of the container bottom meet the other parts of the rotorcraft step or the other parts of the container. For example, a seal may be applied covering the front edge where the container bottom meets the upper panel of the rotorcraft step. Additional seals or other materials may be applied that cover where the sides of the container bottom meet the forward rib and aft rib of the rotorcraft step. Additional seals or other materials may also be applied to cover where the container bottom is attached to the hinge, or over the hinge itself.

Regardless, once the emergency kit is installed and secured to the rotorcraft step, the charged bottle is secured to rotorcraft interior, as referenced in block 930 in FIG. 17. The charged bottle is inserted into the bracket supports in the interior of the rotorcraft. In block 932, the charged bottle is connected to the life raft. The gas via or duct or channel (e.g., a tube) is connected at one end to the life raft, run from the life raft to the charged bottle through an opening through the skin of the rotorcraft, and connected at the other end to the charged bottle. In block 934, an internal activation handle and an external activation handle are installed. In block 936, connect activation handles to a control system, and between the control system and the charged bottle. In some embodiments, the connections are effected with cables or wiring from the internal activation handle and the external activation handle to the control, and from the control to the charged bottle. In some embodiments, in block 938, post-processing may be performed, such as performing various other adjustments to the emergency kit and the rotorcraft step. In some embodiments, the method may further include removing the emergency kit by reversing the above method steps and replacing original rotorcraft step bottom panel after removing the emergency kit.

FIG. 18 illustrates a method for activating an emergency kit that inflates the life raft in the emergency kit and deploys the life raft from the step, in accordance with some embodiments. In block 940, pre-processing or preparation is performed including, e.g., connecting the components of the emergency kit to each other after replacing some of them after inspection. In block 942, a control device receives a request signal from an activation device coupled to the control device. The request signal indicates a request to activate the emergency kit. In block 944, the control device transmits an activation signal to the charged bottle connected to the control device, in response to the request signal. The signal indicates a command to initiate activation of the emergency kit. In block 946, gas is discharged from the charged bottle into a gas duct. The gas duct extends from the charged bottle in the interior of the rotorcraft, to the life raft in the storage cavity inside the step. In block 948, the life raft begins being inflated with the discharged gas. In block 950, the storage cavity is opened to an exterior of the rotorcraft step. The container swings open downwards and away from the interior of the step. In some embodiments, the container is pushed open by the inflating life raft, as indicated in block 950. In other embodiments, the container may be separately opened before or after or while the life raft is inflating in block 948. In block 952, the life raft continues being inflated as the life raft exists the interior of the rotorcraft step. In block 954, the life raft is deployed from the rotorcraft step interior, and pulls the survival kit that is tethered to the life raft away from the rotorcraft step. Once the storage cavity is opened, the inflating life raft can float to the surface of the water as inflation continues, according to some embodiments. In other embodiments, the life raft can be released for deployment by being manually pulled out of the storage cavity. The inflating in block 948 occurs during, or after the removal of the life raft and survival kit from the storage cavity.

In block 956, post-processing is performed. In some embodiments, post-processing includes having the occupants of the rotorcraft use the step on the upper panel to evacuate the rotorcraft, and board the life raft. Once they have boarded, in some embodiments, the method includes further post-processing associated with evacuating the rotorcraft. For example, occupants of the rotorcraft may untether the life raft from the step of the rotorcraft, once they are done boarding the life raft. The occupants may begin using a survival kit in the life raft. The occupants may activate the emergency location transmitter (ELT) in the life raft. In other embodiments, the ELT may be automatically activated, once the emergency kit is activated or when a sensor on the life raft detects inflation and deployment.

An embodiment rotorcraft structure includes a step, and an emergency kit. The step is disposed at an exterior of the rotorcraft. The step has a recess. The step is faired into a skin on the exterior of the rotorcraft. The emergency kit is installed into the recess of the step. The emergency kit includes a container, and a life raft. The container includes a container body, a container panel, and a first attachment element. The container body is disposed in the recess of the step. The container body is attached to the step. The container body has a storage cavity. The container panel is disposed at a bottom of the storage cavity. The life raft is disposed on the container panel, and within the storage cavity. The first attachment element releasably couples a first edge of the container panel to the container body, and retains the life raft in the container.

In some embodiments, the embodiment rotorcraft structure also includes a charged bottle filled with a compressed gas, a gas via for gas discharged from the charged bottle, and a handle coupled to the charged bottle, wherein the charged bottle is disposed in an interior region of the rotorcraft that is remote from the storage cavity, wherein the gas via extends from the charged bottle to the life raft in the storage cavity, and wherein the handle is coupled to the charged bottle, and wherein a pulling of the handle operably initiates the discharge of gas from the charged bottle. In some embodiments, a release of the first attachment element is adapted to uncouple the first edge of the container panel from the container body. In some embodiments, the container further includes a hinge that extends along a second edge of the container panel that is opposite the first edge of the container panel, wherein the hinge retains an attachment to the second edge of the container panel, and couples the second edge of the container panel to the container body, whether the first edge of the container panel is coupled to the container body, or uncoupled from the container body. In some embodiments, the container further includes a second attachment element releasably coupling a second edge of the container panel to the container body, and the container panel is ejectable from the container body. In some embodiments, the recess is disposed under an upper step surface, and the recess spans a length of the step from a first step end to a second step end that is opposite the first step end, wherein the container is attached to the step under the upper step surface, and the container spans a length of the recess, wherein a bottom plane of the container includes a surface of the container panel, wherein the container body includes a plurality of container supports that secure the container to the step, and wherein the plurality of container supports extend upwards from the bottom plane of the container towards an underside of the upper step surface. In some embodiments, the plurality of container supports includes a first container support disposed at a first container end of the container, a second container support disposed at a second container end of the container opposite the first container end, and a mid-container support mechanism disposed between the first container support and the second container support, wherein the storage cavity is continuous across the length of the step, and extends from an interior of the first container support to an interior of the second container support through an open channel around the mid-container support mechanism. In some embodiments, the container body further includes a container top over the first container support and the second container support, and the first attachment element releasably couples the first edge of the container panel to the container top, wherein the container further includes a second attachment element that couples a second edge of the container panel to the container body, wherein the second edge is opposite the first edge, and the second attachment element comprises a releasable coupling, or a hinge, and wherein the releasable coupling adapts the container panel to be ejectable from the container body, and the hinge pivotally attaches the container panel to the container body along the second edge of the container panel. In some embodiments, the step further includes a step upper panel that has the step upper surface, and a middle rib that is disposed under the step upper panel, and that supports the step upper panel, wherein a surface of the recess comprises a bottom surface of the step upper panel, wherein the middle rib extends downwards from the bottom surface of the step upper panel partially into the recess at the underside of the step, wherein the open channel is disposed below the middle rib and over the container panel, and wherein a middle portion of the life raft is disposed in the open channel. In some embodiments, the step further includes a first rib and a second rib disposed under the step upper panel on either side of the middle rib, wherein the container is disposed in an interior space of the step that is continuous from an interior of the first rib to an interior of the second rib, through the open channel that is under the middle rib. In some embodiments, the step further includes a first rib and a second rib disposed under the step upper panel on either side of the middle rib, wherein the container is disposed in an interior space of the step that is continuous from an interior of the first rib to an interior of the second rib, through the open channel that is under the middle rib. In some embodiments, the step further includes a first fairing that covers an exterior of the first rib, and a second fairing that covers an exterior of the second rib, wherein a profile of the container panel substantially maintains a pre-existing outer mold line of the step. In some embodiments, the step is faired into the skin at a location on the exterior of the rotorcraft that is spaced apart from and above a landing gear of the rotorcraft. In some embodiments, the step further includes an access panel opening extending from an interior of the storage cavity to an exterior of the step, wherein the emergency kit further includes a survival kit disposed in the storage cavity, and accessible through the access panel opening.

An embodiment assembly structure includes a container, a life raft in the container, and an inflation mechanism coupled to the life raft. The container includes a container body and a container bottom. The life raft is in the container. The inflation mechanism is coupled to the life raft. The container includes a container body, and a container bottom. The container body includes a container top and a plurality of container sides. The container body has a storage cavity. The container bottom is disposed at a bottom of the storage cavity. The container bottom is releasably coupled to the container body. The life raft has a first portion and a second portion opposite the first portion, and a third portion between the first portion and the second portion. A top surface of the third portion is below a top surface of the first portion, and the top surface of the third portion is below a top surface of the second portion.

In some embodiments, the storage cavity includes a first region, a second region opposite the first region, and an open channel connecting the first region and the second region, wherein the storage cavity is continuous from the first region through the open channel to the second region, and wherein the first portion of the life raft is disposed in the first region, the second portion of the life raft is disposed in the second region, and the third portion is disposed in the open channel. In some embodiments, the plurality of container sides includes a first end attachment member disposed at a first container end, a second end attachment member disposed at a second container end that is opposite to the first container end, and a mid attachment member disposed between the first container end and the second container end, wherein the mid attachment member is shorter than the first end attachment member and the second end attachment member, and wherein a spacing between the first end attachment member and the second end attachment member substantially aligns the first end attachment member and the second end attachment member with interiors of a first end rib and a second end rib in a step on a vehicle. In some embodiments, the embodiment assembly structure further includes a first attachment element coupling a first edge of the container bottom to the container body, and a second attachment element coupling a second edge of the container bottom to the container body, wherein the second edge is opposite the first edge, wherein the first attachment element and the second attachment element secure the container bottom to the container body, and secure the life raft in the storage cavity in the container, wherein the first attachment element is adapted to be releasable by an inflation of the life raft from inside the container, wherein the container bottom is adapted to be ejectable from the container body, when the coupling of the second attachment element is releasable, and wherein the container bottom is adapted to be pivotally retained by the container body along the second edge, when the second attachment element includes a hinge.

In an embodiment method, an emergency kit is provided that includes a container and a life raft in the container. The emergency kit is inserted into a recess of a step on a rotorcraft. The emergency kit is secured to the step. The step is disposed at an egress region of the rotorcraft on an exterior surface of the rotorcraft that is above and separate from a landing gear of the rotorcraft. Once the emergency kit is inserted, the life raft is disposed within a storage cavity having a periphery that includes a bottom interior surface of the container.

In some embodiments of the embodiment method, the recess is created by removing a bottom panel of the step, and an outer surface of the bottom panel of the step is replaced with an outer surface of a bottom of the container. In some embodiments of the embodiment method, after the emergency kit is inserted and secured to the step, the emergency kit is uncoupled from the step, and removed from the recess of the step, and a bottom panel is attached to the step, wherein the bottom panel substantially covers the recess. In some embodiments of the embodiment method, a charged bottle is secured to an interior of the rotorcraft at a first location that is outside of the interior of the step, or at a second location that is within the interior of the step, wherein the charged bottle is filled with gas. In some embodiments of the embodiment method, the life raft in the storage cavity is connected to the charged bottle with a gas channel, for discharged gas from the charged bottle to flow into the life raft, and the charged bottle is coupled to an activation mechanism disposed at a third location that is accessible from a rotorcraft interior and different from the first location and from the second location, wherein an engagement of the activation mechanism is operable to initiate a discharge of gas from the charged bottle into the life raft while the life raft is disposed in the storage cavity. In some embodiments of the embodiment method, the emergency kit is secured by securing each of a plurality of container supports to a respective one of a plurality of step supports in the recess of the step. In some embodiments of the embodiment method, an enclosure of the life raft in the container is secured, prior to deployment, by enclosing the storage cavity with a coupling of a bottom of the container to a container support, wherein the coupling is releasable upon an application of a force beyond a threshold for the coupling, that arises from inflation of the life raft inside the step.

In an embodiment method, a mechanism is released. The mechanism is coupled to a charged bottle, and the mechanism and the charged bottle are disposed in an interior of a rotorcraft. A release of the mechanism activates an emergency kit installed into a step that is disposed at an exterior of the rotorcraft, and that is separate and apart from landing gear of the rotorcraft. Gas is discharged, in response to releasing the mechanism, from the charged bottle into a gas channel that extends from the charged bottle into a life raft in the emergency kit that is disposed in a recess of the step. The emergency kit includes a life raft and a container. The life raft is disposed in a storage cavity in the container. The life raft is inflated, in response to the discharge of gas. The storage cavity is opened to an exterior of the step, in response to the life raft being inflated. The inflating life raft pushes a side of a container panel away from a step surface. The life raft is released from the step. The mechanism is released by sending a release signal to the charged bottle with an electric coupling of the mechanism to the charged bottle, or engaging a release of gas from the charged bottle, with a member that physically couples the mechanism to the charged bottle.

In an embodiment method, a mechanism is released. The mechanism is coupled to a charged bottle, and the mechanism and the charged bottle are disposed in an interior of a rotorcraft. A release of the mechanism activates an emergency kit installed into a step that is disposed at an exterior of the rotorcraft, and that is separate and apart from landing gear of the rotorcraft. Gas is discharged, in response to releasing the mechanism, from the charged bottle into a gas channel that extends from the charged bottle into a life raft in the emergency kit that is disposed in a recess of the step. The emergency kit includes a life raft and a container. The life raft is disposed in a storage cavity in the container. The life raft is inflated, in response to the discharge of gas. The storage cavity is opened to an exterior of the step, in response to the life raft being inflated. The inflating life raft pushes a side of a container panel away from a step surface. The life raft is released from the step. The mechanism is released by sending a release signal to the charged bottle with an electric coupling of the mechanism to the charged bottle, or engaging a release of gas from the charged bottle, with a member that physically couples the mechanism to the charged bottle.

Any one or more of the components or elements in rotorcraft 101 described above may be part of the original production of rotorcraft 101. Alternatively, any one or more components or elements may be provided separately as an add-on kit or as a replacement kit and installed onto existing rotorcraft 101. For example, forward fairings 209a, 209b and aft fairings 211a, 211b may be separately provided in a fairing kit and installed, post-production onto existing steps 201a, 201b. The same is true for emergency kit 301a, 301b.

As used herein, the terms "comprises," "comprising," "includes," "including," "has," "having," or any contextual variant thereof, are intended to reference a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

Further, spatially relative terms, such as "forward," "aft," "front," "back," "beneath," "below," "lower," "above," "upper," and the like, may be used herein for ease of description to describe one element's or feature's relationship to another element or feature as illustrated in the figures. Spatially relative terms are intended to encompass different orientations of the device in use or operation, in addition to the orientation depicted in the figures. The apparatus may otherwise be oriented (rotated 90 degrees or at other orientations) and spatially relative descriptors used herein may likewise be interpreted accordingly.

Additionally, although steps or operations described herein may be presented in a specific order, this order may be changed in different embodiments. In some embodiments, to the extent multiple steps are shown as sequential in the preceding description, some combination of such steps in alternative embodiments may be performed at a same time. The sequence of operations described herein may be interrupted, suspended, or otherwise controlled by another process or system.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or terms. Language designating such non-limiting examples and illustrations includes, but is not limited to: "for example," "for instance," "e.g.," "etc.," "or the like," "in a representative embodiment," "in one embodiment," "in another embodiment," or "in some embodiments." Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to the same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially similar results in correspondence to embodiments described herein, may be utilized according to their description herein. The appended claims are intended to include within their scope such processes, products, machines, articles of manufacture, assemblies, apparatuses, means, methods, or steps.

Benefits, other advantages, and solutions to problems have been described herein with regard to some embodiments. However, any benefits, advantages, solutions to problems, or any component thereof that may cause any benefit, advantage, or solution to occur or to become more pronounced are not to be construed as critical, required, or essential features or components.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A rotorcraft, comprising:
a step disposed at an exterior of a rotorcraft, wherein the step has a recess, and the step is faired into a skin on the exterior of the rotorcraft; and
an emergency kit installed into the recess of the step, wherein the emergency kit comprises a container, and a life raft;
wherein the container comprises:
a container body disposed in the recess of the step, wherein the container body is attached to the step, and the container body has a storage cavity;
a container panel disposed at a bottom of the storage cavity, wherein the life raft is disposed on the container panel, and within the storage cavity; and
wherein a first edge of the container panel is releasably coupled to the container body, and, when closed, retains the life raft in the container.

2. The rotorcraft of claim 1, further comprising:
a charged bottle filled with a compressed gas, wherein the charged bottle is disposed in an interior region of the rotorcraft that is remote from the storage cavity;
a gas channel for gas discharged from the charged bottle, wherein the gas via extends from the charged bottle to the life raft in the storage cavity; and
a handle coupled to the charged bottle, wherein a pulling of the handle is operable to initiate a discharge of gas from the charged bottle.

3. The rotorcraft of claim 1, wherein the container is adapted to uncouple the first edge of the container panel from the container body.

4. The rotorcraft of claim 3, wherein the container further comprises a hinge that extends along a second edge of the container panel that is opposite the first edge of the container panel; and
wherein the hinge retains an attachment to the second edge of the container panel, and couples the second edge of the container panel to the container body, whether the first edge of the container panel is coupled to the container body, or uncoupled from the container body.

5. The rotorcraft of claim 3, wherein a second edge of the container panel is releasably coupled to the container body; and
wherein the container panel is ejectable from the container body.

6. The rotorcraft of claim 1, wherein the recess is disposed under an upper step surface, and the recess spans a length of the step from a first step end to a second step end that is opposite the first step end;
wherein the container is attached to the step under the upper step surface, and the container spans a length of the recess;
wherein a bottom plane of the container comprises a surface of the container panel;
wherein the container body comprises a plurality of container supports that secure the container to the step;
wherein the plurality of container supports extend upwards from the bottom plane of the container towards an underside of the upper step surface, and comprises:
a first side of the container disposed at a first container end of the container;
a second side of the container disposed at a second container end of the container, opposite the first container end; and
a mid-span support disposed between the first side of the container and the second side of the container;
wherein the storage cavity is continuous across the length of the step, and extends from an interior of the first container end to an interior of the second container end through an open channel around the mid-span support.

7. The rotorcraft of claim 6, wherein the container body further comprises a container top over the first side of the container and the second side of the container, and wherein the first edge of the container panel is releasably coupled to the container top; and
wherein a second edge of the container panel is releasably coupled to the container body, wherein the second edge is opposite the first edge
wherein the container panel is ejectable from the container body.

8. The rotorcraft of claim 7, wherein the step further comprises a step upper panel that has the step upper surface, and a middle rib that is disposed under the step upper panel, and that supports the step upper panel;
wherein a surface of the recess comprises a bottom surface of the step upper panel;
wherein the middle rib extends downwards from the bottom surface of the step upper panel partially into the recess at the underside of the step;
wherein the open channel is disposed below the middle rib and over the container panel; and
wherein a middle portion of the life raft is disposed in the open channel.

9. The rotorcraft of claim 8, wherein the step further comprises a first rib and a second rib disposed under the step upper panel on either side of the middle rib; and
wherein the container is disposed in an interior space of the step that is continuous from an interior of the first rib to an interior of the second rib, through the open channel that is under the middle rib.

10. The rotorcraft of claim 9, wherein the step further comprises a first fairing that covers an exterior of the first rib, and a second fairing that covers an exterior of the second rib; and
wherein a profile of the container panel conforms to a pre-existing outer mold line of step.

11. The rotorcraft of claim 1, wherein the step is faired into the skin at a location on the exterior of the rotorcraft that is spaced apart from and above a landing gear of the rotorcraft.

12. The rotorcraft of claim 1, wherein the step further comprises an access panel opening extending from an interior of the storage cavity to an exterior of the step; and
wherein the emergency kit further comprises a survival kit disposed in the storage cavity, and accessible through the access panel opening.

13. An assembly, comprising:
a container; and
a life raft in the container; and
an inflation mechanism coupled to the life raft;
wherein the container comprises:
a container body comprising a container top and a plurality of container sides, wherein the container body has a storage cavity having a first region, a second region opposite the first region, and an open channel connecting the first region and the second region; and
a container bottom disposed at a bottom of the storage cavity, wherein the container bottom is releasably coupled to the container body;

wherein the life raft has a first portion and a second portion opposite the first portion, and a third portion between the first portion and the second portion, wherein the first portion of the life raft is disposed in the first region, wherein the second portion of the life raft is disposed in the second region, and wherein the third portion is disposed in the open channel; and wherein a top surface of the third portion is below a top surface of the first portion, and the top surface of the third portion is below a top surface of the second portion.

14. The assembly of claim 13, wherein the storage cavity is continuous from the first region through the open channel to the second region; and wherein the third portion extends under a mid-span support of the container.

15. The assembly of claim 13, wherein the plurality of container sides comprises:

a first bolt disposed at a first container end;

a second bolt disposed at a second container end that is opposite to the first container end; and a center support disposed between the first container end and the second container end; and wherein the first bolt and second bolt align the first container end and the second container end with interiors of a first end rib and a second end rib in a step on a vehicle.

16. The assembly of claim 13, wherein a first edge of the container bottom is coupled to the container body; and wherein a second edge of the container bottom is coupled to the container body, wherein the second edge is opposite the first edge;

wherein the first edge and second edge being coupled to the container body secure the container bottom to the container body, and secure the life raft in the storage cavity in the container;

wherein the container is adapted to separate at least the first edge of the container bottom from the container body by inflation of the life raft from inside the container; and wherein the container bottom is adapted to be at least one of ejectable from the container body or pivotally retained to the container body along the second edge.

17. A method, comprising:

providing an emergency kit that comprises a container and a life raft in the container;

inserting the emergency kit into a recess of a step on a rotorcraft; and securing the emergency kit to the step;

wherein the step is disposed at an egress region of the rotorcraft on an exterior surface of the rotorcraft that is above and separate from a landing gear of the rotorcraft; and wherein, once the emergency kit is inserted, the life raft is disposed within a storage cavity having a periphery that includes a bottom interior surface of the container.

18. The method of claim 17, further comprising:

creating the recess by removing a bottom panel of the step; and replacing an outer surface of the bottom panel of the step with an outer surface of a bottom of the container.

19. The method of claim 17, further comprising, after the inserting and the securing: uncoupling the emergency kit from the step;

removing the emergency kit from the recess of the step; and attaching a bottom panel to the step, wherein the bottom panel substantially covers the recess.

20. The method of claim 17, further comprising:

securing a charged bottle to an interior of the rotorcraft at a first location that is outside of the interior of the step, or at a second location that is within the interior of the step, wherein the charged bottle is filled with gas;

connecting the life raft in the storage cavity to the charged bottle with a gas channel for discharged gas from the charged bottle to flow into the life raft; and coupling the charged bottle to an activation mechanism disposed at a third location that is accessible from a rotorcraft interior and different from the first location and from the second location, wherein an engagement of the activation mechanism is operable to initiate a discharge of gas from the charged bottle into the life raft while the life raft is disposed in the storage cavity.

21. The method of claim 17, wherein the securing further comprises:

securing each of a plurality of container supports to a respective one of a plurality of step supports in the recess of the step.

22. The method of claim 21, further comprising retaining the life raft in the container, prior to deployment, by engaging a coupling of a bottom of the container to a container support;

wherein the coupling is releasable upon an application of a force beyond a threshold for the coupling, that arises from inflation of the life raft inside the step.

23. A method, comprising:

releasing a mechanism that is coupled to a charged bottle, wherein the mechanism and the charged bottle are disposed in an interior of a rotorcraft, and a release of the mechanism activates an emergency kit installed into a step that is disposed at an exterior of the rotorcraft, and that is separate and apart from landing gear of the rotorcraft;

discharging gas, in response to releasing the mechanism, from the charged bottle into a gas channel that extends from the charged bottle into a life raft in the emergency kit that is disposed in a recess of the step, wherein the emergency kit comprises the life raft and a container, and the life raft is disposed in a storage cavity in the container;

inflating the life raft, in response to discharging the gas;

opening the storage cavity to an exterior of the step, in response to inflating the life raft, by an inflating life raft pushing a side of a container panel away from a step surface; and releasing the life raft from the step;

wherein the releasing comprises sending a release signal to the charged bottle with an electric coupling of the mechanism to the charged bottle, or engaging a release of gas from the charged bottle, with a member that physically couples the mechanism to the charged bottle.

* * * * *